United States Patent
Bisti et al.

(10) Patent No.: US 11,792,121 B2
(45) Date of Patent: *Oct. 17, 2023

(54) METHOD AND SYSTEM FOR MOBILITY MANAGEMENT IN COMMUNICATION NETWORKS

(71) Applicant: Fluidmesh Networks S.r.l., Milan (IT)

(72) Inventors: Luca Bisti, Grosseto (IT); Alessandro Erta, Licciana Nardi (IT); Umberto Malesci, Milan (IT)

(73) Assignee: FLUIDMESH NETWORKS S.R.I., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,405

(22) Filed: Oct. 28, 2022

(65) Prior Publication Data

US 2023/0047857 A1 Feb. 16, 2023

Related U.S. Application Data

(63) Continuation of application No. 17/078,580, filed on Oct. 23, 2020, now Pat. No. 11,502,947.

(30) Foreign Application Priority Data

Oct. 29, 2019 (EP) .................................... 19206014

(51) Int. Cl.
*H04L 45/50* (2022.01)
*H04L 12/46* (2006.01)
(Continued)

(52) U.S. Cl.
CPC .......... *H04L 45/50* (2013.01); *H04L 12/4633* (2013.01); *H04L 45/04* (2013.01); *H04L 45/22* (2013.01); *H04L 45/28* (2013.01)

(58) Field of Classification Search
None
See application file for complete search history.

(56) References Cited

U.S. PATENT DOCUMENTS

| 7,848,329 | B2 | 12/2010 | Berzin |
| 2010/0080190 | A1 | 4/2010 | Berzin |
| 2016/0309524 | A1 | 10/2016 | Barreto De Miranda Sargento et al. |

FOREIGN PATENT DOCUMENTS

WO 2014041002 3/2014

OTHER PUBLICATIONS

Berzin, Oleg, "Mobility Label Based Network: Hierarchical Mobility Management and Packet Forwarding Architecture", Computer Networks 53 (2009) 2153-2181, Elsevier B.V.

(Continued)

*Primary Examiner* — Christine T Duong
(74) *Attorney, Agent, or Firm* — BEHMKE INNOVATION GROUP LLC; James M. Behmke; Jonathon P. Western

(57) ABSTRACT

In one embodiment, a gateway label edge router (G-LER) receives a packet destined for a mobile domain that comprises a vehicle label edge router. The G-LER identifies, from among a plurality of primary domains, a particular primary domain that currently has a label switched connection with the mobile domain. The label switched connection connects the vehicle label edge router of the mobile domain and a cluster label edge router of the particular primary domain. The G-LER sends the packet to the cluster label edge router of the particular primary domain for transmission to the vehicle label edge router via the label switched connection. The G-LER tracks when the vehicle label edge router of the mobile domain establishes a new label switched connection with a second cluster label edge router of a (Continued)

different primary domain in the plurality of primary domains than that of the particular primary domain.

20 Claims, 9 Drawing Sheets

(51) Int. Cl.
    *H04L 45/02*     (2022.01)
    *H04L 45/00*     (2022.01)
    *H04L 45/28*     (2022.01)

(56) References Cited

OTHER PUBLICATIONS

Langar, et al., "An Approach for Mobility Modeling—Towards an Efficient Mobility Management Support in Future Wireless Networks", 2006 IEEE/IFIP Network Operations and Management Symposium NOMS 2006, Apr. 3-7, 2006, pp. 316-326, IEEE.

METHOD AND SYSTEM FOR MOBILITY MANAGEMENT IN COMMUNICATION NETWORKS

RELATED APPLICATION

This application is a continuation of U.S. patent application Ser. No. 17/078,580, filed on Oct. 23, 2020 and claims priority to EP Appl. No. 19206014, filed Oct. 29, 2019, both entitled METHOD AND SYSTEM FOR MOBILITY MANAGEMENT IN COMMUNICATION NETWORKS, by Bisti et al., the entire contents of which are incorporated herein by reference.

TECHNICAL FIELD

The present disclosure relates generally to communication networks and, more particularly, to mobility management in communication networks comprising label switched networks.

BACKGROUND

Label switched networks are networks wherein data packets are forwarded on the basis of labels. A practical implementation of label switching could be based on Multiprotocol Label Switching (MPLS), which is an Internet Engineering Task Force (IETF) standardized protocol. According to MPLS, data packets entering the network at one node, called ingress, are classified into a Forwarding Equivalence Class (FEC). All data packets with a same FEC follow a same primary path (called Label Switched Path or LSP) to a destination node, called egress. The nodes of the network, including intermediate ones, take per-packet forwarding decisions based on label Forwarding Information Base (FIB) tables.

Wireless communication in high-speed vehicular mobility scenarios poses complex technical challenges across several layers of the ISO-OSI stack, including the physical layer (Layer 1), the data layer (Layer 2) and the network layer (Layer 3). Unlike a stationary environment, where roaming is rare and deferred communication is tolerated, in high-speed vehicular mobility scenarios handoff is a certainty. Continuous reliable wireless connection with seamless handoff and sustained communication for smooth operation is required. Moreover, as the train speed increases, communications between the train and infrastructure encounter major difficulties of maintaining such high-quality communication and yet there is no effective solution able to cope with the specific constraints of high-speed trains.

BRIEF DESCRIPTION OF THE DRAWINGS

Further characteristics and advantages of the present disclosure will become clearer from the following detailed description of some preferred embodiments thereof, made as an example and not for limiting purposes with reference to the attached drawings. In such drawings.

DESCRIPTION OF EXAMPLE EMBODIMENTS

Overview

Figure 1:
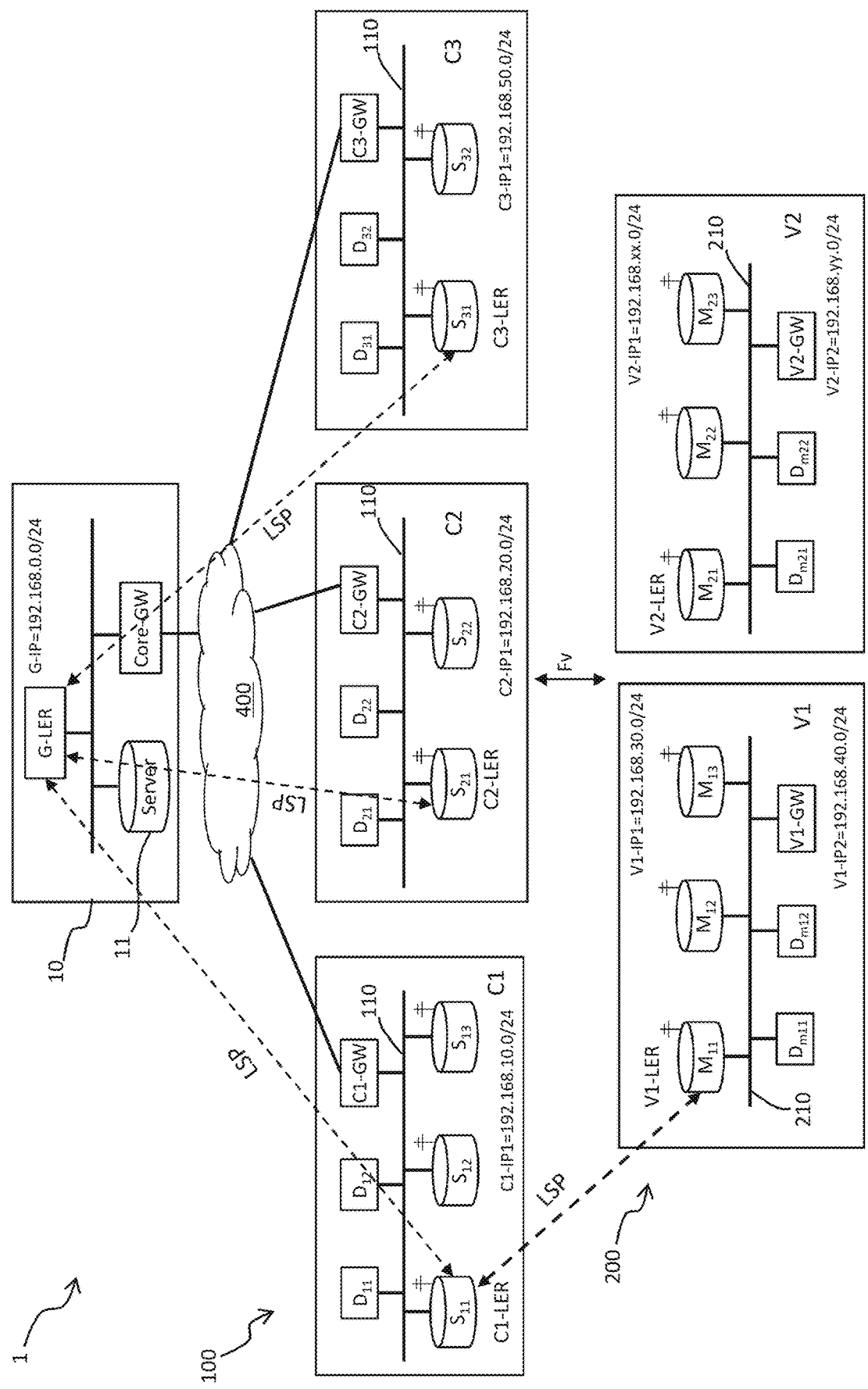
FIG. 1 shows an example network, according to an embodiment of the present disclosure.

In one embodiment, a gateway label edge router receives a packet destined for a mobile domain that comprises a vehicle label edge router. The gateway label edge router identifies, from among a plurality of primary domains, a particular primary domain that currently has a label switched connection with the mobile domain. The label switched connection connects the vehicle label edge router of the mobile domain and a cluster label edge router of the particular primary domain. The gateway label edge router sends the packet to the cluster label edge router of the particular primary domain for transmission to the vehicle label edge router via the label switched connection. The gateway label edge router tracks when the vehicle label edge router of the mobile domain establishes a new label switched connection with a second cluster label edge router of a different primary domain in the plurality of primary domains than that of the particular primary domain.

Description

As noted above, label switched networks are networks wherein data packets are forwarded on the basis of labels. A practical implementation of label switching could be based on Multiprotocol Label Switching (MPLS), which is an Internet Engineering Task Force (IETF) standardized protocol. According to MPLS, data packets entering the network at one node, called ingress, are classified into a Forwarding Equivalence Class (FEC). All data packets with a same FEC follow a same primary path (called Label Switched Path or LSP) to a destination node, called egress. The nodes of the network, including intermediate ones, take per-packet forwarding decisions based on label Forwarding Information Base (FIB) tables.

The present disclosure can be advantageously used in label switched-wireless mesh networks. A wireless mesh network (WMN) is a communication network made up of nodes organized in a mesh topology. The nodes can communicate with each other over wireless and wired links. Wireless mesh networks typically comprise mesh clients, mesh routers and optionally gateways. The mesh clients are often laptops, surveillance cameras, industrial equipment and other network devices while the mesh routers forward traffic to and from the nodes (mesh clients and mesh routers) in the network including, if any, the gateways which may but need not connect to the Internet. The mesh routers forward packets in a multi-hop manner to reach the intended destination within the WMN. Wireless mesh networks can be implemented with various wireless technology including 802.11, 802.15, 802.16 IEEE standards, cellular technologies or combinations of more than one type.

Mobility management in label switched networks enables maintenance of a communication session between a mobile node and another node of the network when the mobile node moves within the network.

The widespread cellular network coverage has made ubiquitous Internet connectivity taken for granted. Such services are evolving and are currently characterized by a rapid increase in their demand for bandwidth. Multimedia contents and communications, such as high-quality video streaming or real time video calls, are gaining popularity and soon end users will expect to access those services from anywhere.

At the same time, the diffusion of high-speed trains is growing worldwide as a rapid and environmentally friendly means of transportation for long-distance mobility. Providing broadband connectivity on trains and subway systems to support multimedia services is becoming a critical service to fulfil customer expectations, appreciated in particular by business travelers.

In addition to improve customers' satisfaction, the evolution towards Intelligent Transportation Systems (ITS) will require a new generation of services for control, automation and monitoring. The implementation of real-time video surveillance for remote surveillance of trains and the installation of a typically of sensors and actuators for remote diagnostic and telemetry will demand for broadband connectivity that can ensure reliability, customizable QoS (Quality of Service) and high bandwidth.

Wireless communication in high-speed vehicular mobility scenarios poses complex technical challenges across several layers of the ISO-OSI stack, including the physical layer (layer 1), the data layer (layer 2) and the network layer (layer 3).

Unlike a stationary environment, where roaming is rare and deferred communication is tolerated, in high-speed vehicular mobility scenarios handoff is a certainty. Continuous reliable wireless connection with seamless handoff and sustained communication for smooth operation is required.

Moreover, as the train speed increases, communications between the train and infrastructure encounter major difficulties of maintaining such high-quality communication and yet there is no effective solution able to cope with the specific constraints of high-speed trains. Handoff on high-speed trains occur more frequently and have shorter permissible handling times than for traditional vehicles.

High-speed mobility scenarios exhibit extreme challenges for standard network layer protocols. IP address reconfiguration mechanisms, like Mobile IP, are not fast enough to react to network changes.

Handoff management is critical to provide a fluid connection and a continuous service across the whole train path. State-of-the-art technologies allows handoff times in the order of a few hundred milliseconds on the control plane and they are usually unable to maintain a persistent connection during the process on the data plane (break-before-make approach), like in the case of the IEEE 802.11 (commonly known as Wi-Fi). This level of service is insufficient to provide an acceptable performance in high-speed mobility scenarios. For instance, a train traveling at 300 Km/h covers roughly 80 meters in 1 second. Therefore, a handoff time of 1 second, as for the IEEE 802.11, it is insufficient to provide a good level of service. The train will be too far away from the location where the handoff has been initiated, finding completely different channel conditions that might even prevent the handoff from successfully complete.

A key observation noted herein is that, when the network grows to a very large size, for example up to the order of hundreds or thousands of nodes, the network architecture should be adapted and properly structured in order to guarantee full scalability of the network and facilitate the management of network reachability information. Indeed, as the network sizes grow, the traffic overhead due to the amount of signaling information spread over the Layer-2 network significantly increases.

Therefore, it is an object of the present disclosure to provide a technique that enables to effectively manage mobility, even in network of growing sizes (e.g. comprising hundreds or thousands of nodes).

It is a further object of the present disclosure to provide a technique for mobility management in a label switched network that enables to reduce signaling and information spreading through the network, bandwidth usage and employment of node resources (that is, memory usage, processing, number of FIB table entries, number of updating operations on FIB tables, and similar).

It is another object of the present disclosure to provide a technique for mobility management in a label switched network which is able to react very quickly (e.g. with latency in the order of few milliseconds) to changes of the network topology due to nodes mobility, and to possibly eliminate (or significantly reduce) any loss of data packets during the process of mobility management and reconfiguration of the network.

In some embodiments, the present disclosure relates to a method of mobility management in a communication network comprising:
- a core network comprising a Gateway Label Edge Router (G-LER);
- an infrastructure network comprising P primary domains (C1, C2, C3), with P≥1, each primary domain (Cj), with j integer between 1 and P, comprising Nj label switched nodes, with Nj≥1; and a Cluster Label Edge Router (Cj-LER), selected from the Nj label switched nodes,
- a mobile network comprising K mobile domains (V1, V2, V3), with K≥1, each mobile domain (Vi), with i integer between 1 and K, comprising Mi label switched nodes, with Mi≥1, and a Vehicle Label Edge Router (Vi-LER), selected from the Mi label switched nodes, wherein:
- the Nj label switched nodes of the P primary domains (C1, C2, C3) and the Mi label switched nodes of the K mobile domains (V1, V2, V3) wirelessly communicate to each other,
- each mobile domain (Vi) is movable with respect to the P primary domains (C1, C2, C3), and, depending on its position with respect to the P primary domains (C1, C2, C3), establishes a label switched connection with one primary domain (Cj) of the P primary domains (C1, C2, C3) at a time, via a label switched path between the Cluster Label Edge Router (Cj-LER) of said one primary domain (Cj) and the Vehicle Label Edge Router (Vi-LER) of said mobile domain (Vi),
- the Gateway Label Edge Router (G-LER) stores in a database information about label switched paths connecting the Gateway Label Edge Router (G-LER) with each of the Cluster Label Edge Router (Cj-LER) of the P primary domains (C1, C2, C3);
- for each mobile domain (Vi), the Gateway Label Edge Router (G-LER) keeps track in said database of the primary domain (Cj) which currently has an established label switched connection with the mobile domain (Vi);
- for each packet addressed to a mobile domain (Vi) of the K mobile domains (V1, V2, V3), the Gateway Label Edge Router (G-LER) retrieves, from said database, the primary domain (Cj) which currently has an established label switched connection with the mobile domain (Vi); and the packet is made to travel along the label switched path connecting the Gateway Label Edge Router (G-LER) to the Cluster Label Edge Router (Cj-LER) of the primary domain (Cj) which currently has an established label switched connection with the mobile domain (Vi), and along the label switched path between the Cluster Label Edge Router (Cj-LER) of the primary domain (Cj) which currently has an established label switched connection with the mobile domain (Vi) and the Vehicle Label Edge Router (Vi-LER) of said mobile domain (Vi);

for each packet from a mobile domain (Vi) of the K mobile domains (V1, V2, V3) to the core network, the packet is made to travel along the label switched path between the Vehicle Label Edge Router (Vi-LER) of said mobile domain (Vi) and the Cluster Label Edge Router (Cj-LER) of the primary domain (Cj) which currently has an established label switched connection with said mobile domain (Vi), and along the label switched path connecting the Cluster Label Edge Router (Cj-LER) of the primary domain (Cj) which currently has an established label switched connection with said mobile domain (Vi) and the Gateway Label Edge Router (G-LER).

In addition, in further embodiments, the present disclosure relates to a communication network comprising:

a core network comprising a Gateway Label Edge Router (G-LER);

an infrastructure network comprising P primary domains (C1, C2, C3), with P≥1, each primary domain (Cj), with j between 1 and P, comprising Nj label switched nodes, with Nj≥1; and a Cluster Label Edge Router (Cj-LER), selected from the Nj label switched nodes, a mobile network comprising K mobile domains (V1, V2, V3), with K≥1, each mobile domain (Vi), with i between 1 and K, comprising Mi label switched nodes, with Mi≥1 and a Vehicle Label Edge Router (Vi-LER), selected from the Mi label switched nodes, wherein the Gateway Label Edge Router (G-LER), the Cluster Label Edge Router (Cj-LER) of each primary domain (Cj) and the Vehicle Label Edge Router (Vi-LER) of each mobile domain (Vi) are configured so as to carry out the method according to the present disclosure.

Preferably, all the Nj label switched nodes of the P primary domains (C1, C2, C3) and all the Mi label switched nodes of the K mobile domains (V1, V2, V3) are also configured so as to carry out the method according to the present disclosure.

According to another aspect, the present disclosure relates to a Gateway Label Edge Router (G-LER) configured so as to carry out those steps of the method according to the present disclosure that relate to the Gateway Label Edge Router (G-LER).

According to another aspect, the present disclosure relates to a Cluster Label Edge Router (Cj-LER) of a primary domain (Cj) configured so as to carry out those steps of the method according to the present disclosure that relate to the Cluster Label Edge Router (Cj-LER).

According to another aspect, the present disclosure relates to a Vehicle Label Edge Router (Vi-LER) of a mobile domain (Vi) configured so as to carry out those steps of the method according to the present disclosure that relate to the Vehicle Label Edge Router (Vi-LER).

According to the present disclosure, the communication network is more efficiently organized in a number of smaller broadcast domains where each broadcast domain is assigned an individual IP subnet. General communications between the different broadcast domains can be carried out by standard IP routing.

The communication network is provided with a plurality of primary domains and mobile domains, each forming a respective broadcast domain, assigned to a respective IP subnet. All packets directed to and from a mobile domain are handled by means of a central unit (G-LER) in the core network configured to keep track, for each mobile domain Vi, of the primary domain which currently has an established wireless connection with the mobile domain as well as by means of suitable units (Cj-LER and Vi-LER) in the primary domains and mobile domains, which act as ingress/egress nodes of LSPs. Packets directed to and from a mobile domain are made to travel along two disjoint Layer-2 LSPs, namely on a LSP established between a Vi-LER of the mobile domain and the Cj-LER of the currently connected primary domain, and a LSP established between the Cj-LER of the currently connected primary domain and the G-LER in the core network.

Mobility of the communication network is fully managed by using two levels of Layer-2 connections (LSPs), notwithstanding the organization of the network in multiple IP subnets.

Nodes and client devices of the mobile domains maintain their IP subnet and host addresses during mobility. In fact, when the mobile domain changes its point of attachment to the fixed infrastructure, the whole on-board network (with its IP subnet(s)) moves as single entity from the perspective of the rest of the network, and vice versa (network mobility). In the present disclosure, when mobility occurs, the whole network reconfiguration is entirely confined within the label-switched nodes using a limited amount of information exchange, effectively hiding the effects of mobility to the rest of the network. In particular, no Layer-3 routing updates are sent outside the label-switched nodes, e.g. to the other switches/routers (that are not involved/active in carrying out the method of mobility management according to the present disclosure) and the client devices of both the fixed infrastructure and the mobile domains.

In a mobility scenario, this enables to simplify the reconfiguration of the network, without disrupting its service, by limiting the signaling and information spreading through the network, the bandwidth usage and the employment of node resources and, thus, to react very quickly (e.g. with latency in the order of few milliseconds) to changes of the network topology due to mobility of entire broadcast domains with respect to each other.

In the present description and claims, the term "node" is used to indicate a router or any other device (such as a PC, a mobile phone, a PDA and similar) configured so as to carry out the method of mobility management according to the present disclosure.

In the present description and claims, the expression "label-switched node" is used to indicate a node configured to forward packets through label switching (e.g., via MPLS).

In the present description and claims, the expression "client device" is used to indicate a device (such as PCs, laptops, video surveillance cameras, industrial equipment or similar devices) which may be connected directly or indirectly to a label-switched node but which is not active in carrying out the method of mobility management according to the present disclosure. The mobility management is performed in a seamless way with respect to client devices.

In the present description and claims, the expression "primary domain" indicates a pivot domain used as a reference domain for the mobility of one or more mobile domains. The expression "primary domain" may include the case of a primary domain which is movable itself.

In the present disclosure, a mobile domain is movable as a whole with respect to a primary domain. This means that all devices (nodes, client devices, gateway . . . ) of a mobile domain move together, as a whole, as if they were a single piece, with respect to all devices (nodes, client devices, gateway . . . ) of a primary domain. A mobile domain can be installed on a vehicle as, for example, a (ferry)boat, a train, a subway train, a bus, a car or similar vehicle. On the other side, a primary domain can be installed on a railway line, coastwise, on a road line and similar.

In the present description and claims, the expression "IP subnet" indicates a part of a communication network, having assigned an IP addresses range with a common IP subnet prefix (e.g. 192.168.0.0/24), which is unique in the whole communication network (that is, not used anywhere else in the rest of the communication network). All nodes/devices in the same IP subnet share the same IP subnet prefix and are assigned an IP address belonging to the IP addresses range corresponding the IP subnet prefix. In the fixed infrastructure part of the network, each IP subnet is interconnected with the rest of the communication network via Layer-3 switches or routers by using IP addressing/routing. Mobile IP subnets hosted on mobile domains are connected to the infrastructure network through a wireless connection.

In the present description and claims, the expression "broadcast domain" indicates an IP subnet wherein all nodes and client devices can reach each other in the data link layer by using Layer-2 (e.g. MAC) addressing.

The dependent claims refer to particularly advantageous embodiments of the present disclosure.

The present disclosure in at least one of the aforementioned aspects can be implemented according to one or more of the following embodiments, optionally combined together.

Preferably, each mobile domain (Vi) establishes a label switched connection with one primary domain (Cj) of the P primary domains (C1, C2, C3) at a time, via a label switched path between the Cluster Label Edge Router (Cj-LER) of said one primary domain (Cj) and the Vehicle Label Edge Router (Vi-LER) of said mobile domain (Vi), which provides at any given time an optimal connection quality according to a predetermined metric (e.g., in term of signal strength P) between the mobile domain V1 and any of the primary domains C1, C2, C3.

Preferably, the Cluster Label Edge Router (Cj-LER) of each primary domain (Cj) keeps track in a respective store of any mobile domain (Vi) which currently has an established label switched connection with it.

Preferably, the Vehicle Label Edge Router (Vi-LER) of each mobile domain (Vi) keeps track in a respective store of the (single) primary domain (Cj) which currently has an established label switched connection with it.

Preferably, for each packet addressed to a mobile domain (Vi) of the K mobile domains (V1, V2, V3), the Cluster Label Edge Router (Cj-LER) of each primary domain (Cj) sends the packet directly to said mobile domain (Vi), if there is a currently established label switched connection with it, via the label switched path between said Cluster Label Edge Router (Cj-LER) and the Vehicle Label Edge Router (Vi-LER) of the mobile domain (Vi).

Preferably, for each packet addressed to a mobile domain (Vi) of the K mobile domains (V1, V2, V3), the Cluster Label Edge Router (Cj-LER) of each primary domain (Cj) sends the packet to a default gateway (Cj-GW) of said primary domain (Cj) if there is not a currently established label switched connection with the mobile domain (Vi). In alternative, for each packet addressed to a mobile domain (Vi) of the K mobile domains (V1, V2, V3), the Cluster Label Edge Router (Cj-LER) of each primary domain (Cj) sends the packet to the Gateway Label Edge Router (G-LER), if there is not a currently established label switched connection with the mobile domain (Vi), via the label switched path connecting said Cluster Label Edge Router (Cj-LER) to the Gateway Label Edge Router (G-LER).

Preferably, for each packet addressed to the core network and coming from a mobile domain (Vi) of the K mobile domains (V1, V2, V3), with which it currently has an established label switched connection, the Cluster Label Edge Router (Cj-LER) of each primary domain (Cj) sends the packet to the Gateway Label Edge Router (G-LER), via the label switched path connecting said Cluster Label Edge Router (Cj-LER) to the Gateway Label Edge Router (G-LER).

Preferably, the Vehicle Label Edge Router (Vi-LER) of each mobile domain (Vi) sends packets to the primary domain (Cj) which currently has an established label switched connection with the mobile domain (Vi), via the label switched path between said Vehicle Label Edge Router (Vi-LER) and the Cluster Label Edge Router (Cj-LER) of said primary domain (Cj).

Preferably, before sending any packet through any of the label switched paths connecting the Gateway Label Edge Router (G-LER) with each of the Cluster Label Edge Router (Cj-LER) of the P primary domains (C1, C2, C3), the packet is encapsulated into a Layer 2-over-Layer 3 tunnel.

Preferably, when a mobile domain (Vi) of the K mobile domains (V1, V2), having an established label switched connection with a current primary domain of the P primary domains (C1, C2, C3), establishes a label switched connection with a new primary domain (Cj) of the P primary domains (C1, C2, C3), a global handoff procedure is executed between the Cluster Label Edge Router (Cj-LER) of the new primary domain (Cj) and the Gateway Label Edge Router (G-LER).

Preferably, the label switched connection with the new primary domain (Cj) is established to provide at any given time an optimal connection quality according to a predetermined metric (e.g., in term of signal strength P) between the mobile domain V1 and any of the primary domains C1, C2, C3.

Preferably, in the global handoff procedure, the Cluster Label Edge Router (Cj-LER) of the new primary domain (Cj) updates the respective store to keep track of the mobile domain (Vi) which currently has an established label switched connection with it.

Preferably, in the global handoff procedure, the Cluster Label Edge Router (Cj-LER) of the new primary domain (Cj) sends a ROUTEUPD message to the Gateway Label Edge Router (G-LER), including information that enables the Gateway Label Edge Router (G-LER) to keep track in said database of the new primary domain (Cj) which currently has an established label switched connection with the mobile domain (Vi).

Preferably, said ROUTEUPD message is sent through the label switched path connecting the Cluster Label Edge Router (Cj-LER) of the new primary domain (Cj) and the Gateway Label Edge Router (G-LER).

Preferably, upon reception of the ROUTEUPD message, the Gateway Label Edge Router (G-LER) uses the information received to update its database.

Preferably, upon reception of the ROUTEUPD message, the Gateway Label Edge Router (G-LER) sends a further ROUTEUPD message to the Cluster Label Edge Routers (Cj) of other primary domains of the P primary domains (C1, C2, C3), other than the new primary domain (Cj), said further ROUTEUPD message including information enabling the Cluster Label Edge Routers (Cj) of said other primary domains to nullify any label switched connection previously established with the mobile domain (Vi).

Preferably, said further ROUTEUPD message is sent through the label switched path connecting the Gateway Label Edge Router (G-LER) and the Cluster Label Edge Routers (Cj-LER) of said other primary domains.

Preferably, upon reception of the further ROUTEUPD message, the Cluster Label Edge Routers (Cj-LER) of said other primary domains use the information received to update the respective stores.

Preferably, upon reception of the further ROUTEUPD message, the Cluster Label Edge Routers (Cj-LER) of said other primary domains forward the same ROUTEUPD message to the other label-switched nodes of the same primary domain (Cj), which also use the information received to update the respective stores.

Preferably, the label switched path between the Cluster Label Edge Router (Cj-LER) of each primary domain (Cj) and the Vehicle Label Edge Router (Vi-LER) of each mobile domain (Vi) passes through a couple of a primary border node (SB; SB'), selected from the Nj label-switched nodes of the primary domain (Cj), and a mobile border node (MB; MB'), selected from the Mi mobile label-switched nodes of the mobile domain (Vi).

Preferably, the primary border node (SB; SB') and the mobile border node (MB; MB') are selected as a couple of nodes, which provides at any given time an optimal connection quality according to a predetermined metric (e.g., in term of signal strength P).

Preferably, when a current couple of primary border node (SB) and mobile border node (MB) changes into a new couple of primary border node (SB') and mobile border node (MB'), a local handoff procedure is executed to establish a new label switched path between the Cluster Label Edge Router (Cj-LER) of the respective primary domain (Cj) and the Vehicle Label Edge Router (Vi-LER) of the respective mobile domain (Vi), said new label switched path passing through the new couple of primary border node (SB') and mobile border node (MB').

Preferably, in the local handoff procedure, the new mobile border node (MB') sends a request message to the new primary border node (SB'), the request message comprising labels adapted to enable the new primary border node (SB') to form label switched paths from the new primary border node (SB') to the Mi label switched nodes of the mobile domain (Vi), via the mobile border node (MB; MB').

Preferably, at the receipt of said request message, the new primary border node (SB') sends a response message to the new mobile border node (MB'), the response message comprising labels adapted to enable the new mobile border node (MB') to form label switched paths from the new mobile border node (MB; MB') to the Nj label switched nodes of the primary domain (Cj), via the new primary border node (SB').

Preferably, at the receipt of said request message, the new primary border node (SB') also sends a notify message comprising stacking labels, allocated to the Mi label switched nodes, to at least part of the Nj label switched nodes of the primary domain (Cj).

Preferably, at the receipt of said response message, the new mobile border node (MB') sends a notify message comprising stacking labels, allocated to said Nj label switched nodes of the primary domain (Cj), to at least part of the Mi label switched nodes.

Preferably, each mobile domain (Vi) is assigned to an IP subnet.

Preferably, each mobile domain (Vi) forms a broadcast domain.

Preferably, each primary domain (Cj) is assigned to an IP subnet.

Preferably, each primary domain (Cj) forms a broadcast domain.

Preferably, the core network is assigned to an IP subnet.

Preferably, the core network forms a broadcast domain.

Preferably, the core network comprises a server having said database.

Preferably, the core network comprises a default core gateway (core-GW).

Preferably, the default core gateway (core-GW) in the core network routes all packets addressed to a mobile domain (Vi) of the K mobile domains (V1, V2, V3) to the Gateway Label Edge Router (G-LER).

Preferably, each primary domain (Cj) comprises a default gateway (Cj-GW)

Preferably, the default gateway (Cj-GW) of each primary domain (Cj) routes all packets to the default core gateway (core-GW). As an alternative, the default gateway (Cj-GW) of each primary domain (Cj) routes all packets addressed to any mobile domain (Vi) of the K mobile domains (V1, V2, V3) to the Cluster Label Edge Router (Cj-LER) of the primary domain (Cj). In this latter alternative, packets other than packets addressed to any mobile domain (Vi) are sent to the default core gateway (core-GW).

Preferably, the label switched paths are MPLS LSPs.
Preferably, the label switched paths are Layer-2 LSPs.
Preferably, for each mobile domain (Vi), the Gateway Label Edge Router (G-LER) keeps track in said database of the primary domain (Cj) which currently has an established label switched connection with the mobile domain (Vi) by means of suitable FIB tables.

Preferably, the Cluster Label Edge Router (Cj-LER) of each primary domain (Cj) keeps track in the respective store of any mobile domain (Vi) which currently has an established label switched connection with it by means of suitable FIB tables.

Preferably, the Vehicle Label Edge Router (Vi-LER) of each mobile domain (Vi) keeps track in the respective store of any primary domain (Cj) which currently has an established label switched connection with it by means of suitable FIB tables.

Preferably, the Nj label switched nodes of the P primary domains (C1, C2, C3) and the Mi label switched nodes of the K mobile domains (V1, V2, V3) wirelessly communicate to each other through at least one wireless channel (Fv).

FIG. 1 shows a network 1 according to an embodiment of the present disclosure comprising a core network 10, an infrastructure network 100 and a mobile network 200. From a networking perspective, the whole network 1 is organized as multiple Layer-3 (e.g. IP or Internet protocol) subnets interconnected via Layer-3 switches or routers.

Each Layer-3 subnet is assigned an IP addresses range with a common IP subnet prefix (e.g. 192.168.0.0/24; 192.168.10.0/24; 192.168.20.0/24; 192.168.50.30/24), which is unique in the whole network 1 (not used anywhere else in the rest of the network 1). All nodes/devices in the same Layer-3 subnet share the same IP subnet prefix and are assigned an IP address belonging to the IP addresses range corresponding the IP subnet prefix. Moreover, each IP subnet contains a default gateway that interconnects with the rest of the network through standard IP routing. On the other side, each Layer-3 subnet forms a broadcast (Layer-2) domain, meaning that within each IP subnet all nodes and devices can reach each other in the data link layer (layer 2).

The core network 10 typically contains data servers, traffic management equipment and other critical systems. In most cases, devices located here represent one end-point of nearly all communications to mobile network 200. Any firewalls/gateways that provide public Internet connectivity to clients on mobile network 200 are also hosted in the core network 10. For the sake of simplicity, in FIG. 1 only an exemplarily data server 11 is shown, together with a Gateway Label Edge Router (hereinafter also shorten with the abbreviation "G-LER") and a default core gateway (hereinafter also shorten with the abbreviation "core-GW").

As better explained hereinafter, the G-LER acts as ingress/egress node of LSPs established to manage all packets exchanged between the core network 10 and mobile domains Vi.

From a networking perspective, the core network 10 is an IP subnet served by the core-GW and having assigned an IP addresses range (e.g. 192.168.0.0/24).

The wireless infrastructure network 100 comprises a (typically large) number (for example up to the order of hundreds or thousands) of label-switched wireless nodes that are used to provide persistent connectivity to the mobile network 200. The label-switched wireless nodes are connected to an existing high-speed wired backbone 400 that provides connectivity to several client devices deployed along the wireless infrastructure network 100 (cameras, intelligent displays, etc.).

Routing configuration and management in the backbone 400 can be implemented either statically or dynamically using any suitable network protocol and it is outside the scope of this disclosure. Furthermore, the backbone 400 may contain heterogeneous segments implemented using any suitable communication technology. Examples of such technologies are: Ethernet, optical fiber, Layer-2 VPNs (Virtual Private Networks) over broadband xDSL (Digital Subscriber Line), wireless technologies such as IEEE 802.11, cellular, and similar.

According to the present disclosure and as shown in the example of FIG. 1, for management and scalability reasons, the label-switched wireless nodes in the wireless infrastructure network 100 are clustered in P primary domains, with P integer greater or equal than 1.

In the example of FIG. 1, three primary domains C1, C2, C3 are exemplarily shown (P=3).

Each primary domain Cj (with $1 \leq j \leq P$) comprises a number Nj of label switched nodes, with $Nj \geq 1$. In the example of FIG. 1, C1 has three (N1=3) label switched nodes S11, S12, S13; C2 has two (N2=2) label switched nodes S21, S22 and C3 has two (N3=2) label switched nodes S31, S32.

Moreover, each primary domain Cj comprises a number of client devices to be managed. In the example of FIG. 1, C1 has two client devices D11, D12; C2 has two client devices D21, D22 and C3 has two client devices D31, D32.

Each primary domain Cj is an IP (Internet protocol, Layer-3) subnet and an independent broadcast (Layer-2) domain.

As said before, this means that each primary domain Cj is assigned a IP addresses range with a common IP subnet prefix Cj-IP (e.g. 192.168.10.0/24; 192.168.20.0/24; 192.168.50.0/24), which is unique in the whole network 1 (not used anywhere else in the rest of the network 1). All label switched nodes and client devices in the same primary domain Cj share the same IP subnet prefix and are assigned an IP address belonging to the IP addresses range corresponding the IP subnet prefix. Moreover, as IP subnet, each primary domain Cj is interconnected with the rest of the network (e.g. other primary domains, mobile domains, core network 10) via Layer-3 switches or routers (by using IP addressing/routing). On the other side, as in a broadcast (Layer-2) domain, in each primary domain Cj all nodes and devices can reach each other in the data link layer via Layer-2 (e.g. MAC) switches/routers, by using Layer-2 addresses.

At least one default gateway is present in each primary domain Cj to allow the local nodes and devices to reach via Layer-3 connections any other IP subnet. In the example of FIG. 1, each primary domain Cj comprises a default gateway (hereinafter also shorten with the abbreviation "Cj-GW").

Moreover, according to the present disclosure each primary domain Cj also comprises a Cluster Label Edge Router (Cj-LER), elected from the Nj label switched nodes. In the example of FIG. 1, S11, S21 and S31 are the selected ones. The election method used to select the Cj-LER is outside the scope of the present disclosure.

As better explained hereinafter, the Cj-LER acts as the ingress/egress point of LSPs established to handle all network traffic ending, originating or passing in/through the primary domain Cj, and directed to/from the mobile network 200.

Each primary domain Cj comprises a LAN (local area network) 110 providing connectivity inside the primary domain Cj. Preferably, the LAN 110 is implemented by using Ethernet technology. However, other technologies may be used as, for example, optical fiber, Layer-2 VPNs over broadband xDSL, wireless technologies such as IEEE 802.11, cellular, and similar.

The LAN 110 can be wired (as exemplarily shown in FIG. 1) and/or wireless.

In each primary domain Cj, the Nj label switched nodes can be connected to each other either via wired (as exemplarily shown in FIG. 1) or wireless links (or any combination of them) by means of suitable wireless/wired interfaces.

In each primary domain Cj, the Nj label switched nodes have a wireless interface with a radio configured to communicate on a wireless channel Fv. The wireless channel Fv enables them to radio communicate with the mobile network 200.

The wireless communication can be implemented, for example, by using IEEE 802.11 technology.

The mobile network 200 comprises K mobile domains, with K integer$\geq 1$.

In the example of FIG. 1, two primary domains V1, V2 are shown (K=2).

Each mobile domain Vi (with $1 \leq i \leq K$) comprises a number Mi of label switched nodes, with $Mi \geq 1$. In the example of FIG. 1, V1 has three (M1=3) label switched nodes M11, M12, M13 and V2 has three (M2=3) label switched nodes M21, M22, M23.

Moreover, each mobile domain Vi comprises a number of client devices to be managed. In the example of FIG. 1, V1 has two client devices Dm11, Dm12 and V2 has two client devices Dm21, Dm22.

Each mobile domain Vi is an IP (Internet protocol, Layer-3) subnet and an independent broadcast (Layer-2) domain.

As said before, this means that each mobile domain Vi is assigned an IP addresses range with a common IP subnet prefix Vi-IP1 (e.g. 192.168.30.0/24), which is unique in the whole network 1 (not used anywhere else in the rest of the network 1). All label switched nodes Mi and client devices Dm11, Dm12, Dm21, Dm22 in the same mobile domain Vi share the same IP subnet prefix and are assigned an IP address belonging to the IP addresses range corresponding the IP subnet prefix. Moreover, as IP subnet, each mobile domain Vi is interconnected with the rest of the network 1 (e.g. other mobile domains Vi, primary domains Pj, core network 10) via Layer-3 switches or routers (by using IP addressing/routing). On the other side, as in a broadcast (Layer-2) domain, in each mobile domain Vi all nodes Mi and client devices Dm11, Dm12, Dm21, Dm22 can reach each other at the data link layer (layer 2).

According to the present disclosure, each mobile domain Vi also comprises a Vehicle Label Edge Router (Vi-LER), elected from the Mi label switched nodes. In the example of FIG. 1, M11 and M21 are the elected ones. The election method used to select the Vi-LER is outside the scope of the present disclosure.

As better explained hereinafter, the elected Vi-LER acts as the ingress/egress point of LSPs established to handle all network traffic directed to/from the rest of the network 1.

One or more additional IP subnets Vi-IPx (e.g. Vi-IP2=192.168.40.0/24) may be present on the same mobile domain Vi (besides the above-mentioned IP subnet Vi-IP1 assigned to the mobile domain Vi). In this case, an on-board router Vi-GW is responsible for routing the traffic directed to/from them. When such on-board router is present, its routing configuration uses the Vi-LER as the default gateway. This means that all traffic arriving at the on-board router Vi-GW, and directed to the rest of the network 1, is by default directed to the Vi-LER using a network interface configured on the Vi-LER's subnet Vi-IP1.

In each mobile domain Vi, the Mi label switched nodes have a wireless interface with a radio configured to communicate on the wireless channel Fv.

Each mobile domain Vi comprises a LAN (local area network) 210 providing Layer-2 connectivity inside the mobile domain 200. Preferably, the LAN 210 is implemented by using Ethernet technology. However, other technologies may be used as, for example, optical fiber, Layer-2 VPNs, wireless technologies such as IEEE 802.11, and similar.

The LAN 210 can be wired (as exemplarily shown in FIG. 1) and/or wireless.

Each mobile domain Vi can be a vehicle as, for example, a (ferry)boat, a train, a subway train, a bus, a car or similar vehicle.

The P primary domains C1, C2, C3 can be installed on a railway line, coastwise, on a road line and similar.

The client devices D11, D12, D21, D22, D31, D32, Dm11, Dm12, Dm21, Dm22 of the primary domains C1, C2, C3 and mobile domains V1, V2 can be, for example, video surveillance cameras, laptops, PCs, industrial equipment, or similar.

The client devices D11, D12, D21, D22, D31, D32, Dm11, Dm12, Dm21, Dm22 can be connected to the respective LANs 110, 210 either directly or through a wireless access point (not shown). The wireless access point(s) can be, for example, a wireless modem/router, a PC, a mobile phone, a laptop or a similar device providing wireless access point functionality.

In an embodiment, the Nj and Mi label-switched nodes in the P primary domains Cj and K mobile domains Vi are label-switched routers, preferably mesh routers.

Packet forwarding among the Nj and Mi label-switched nodes in the P primary domains C1, C2, C3 and K mobile domains V1, V2 is performed through label switching. Preferably, MPLS technology is used to deliver IP-encapsulated data.

As stated above, MPLS relies on label identifiers, rather than the network destination (IP) address as in traditional IP routing, to determine the sequence of nodes to be traversed to reach the end of a path. A sequence of label-switched nodes configured to deliver packets from an ingress node to an egress node using label switching is denoted as a Label Switched Path (LSP) or "tunnel". The ingress node classifies incoming packet according to a set of Forwarding Equivalence Classes (FECs), depending on the IP destination address of the packet; when a packet matches a class, it is marked with a label associated with the particular class and then forwarded to the next-hop node of the LSP, according to the information configured into the Forwarding Information Base (FIB) table of the ingress node. Subsequently, each intermediate node manipulates the label(s) stored into the packet and then forwards the packet to the next-hop node, according to the information configured into the Forwarding Information Table (FIB) of the intermediate node. The egress node finally removes the label and handles the packet using standard Layer-3 (e.g. IP) routing functions. As stated above, according to the present disclosure, the G-LER, Cj-LERs and Vi-LERs act as ingress/egress nodes of LSPs established to manage all packets exchanged between the core network 10 and the mobile domains Vi. The Cj-LERs primarily act as intermediaries between the G-LER and the Vi-LERs, but they can also act as local ingress/egress points for traffic directed to/from the Vi-LERs.

At network startup, within each primary domain Cj, the Nj label-switched nodes install intra-primary-domain label-switched paths LSPs amongst themselves to ensure full connectivity across the primary domain Cj. Intra-primary-domain labels are suitably configured into the FIBs of the Nj label-switched nodes. At network startup, within each mobile domain Vi, the Mi mobile label-switched nodes install intra-mobile-domain label-switched paths amongst themselves to ensure full connectivity across the mobile domain 200. Intra-mobile-domain labels are suitably configured into the FIBs of the Mi mobile label-switched nodes.

The MPLS signaling which constructs said-intra-primary-domain/intra-mobile-domain label-switched paths is carried out by a suitable protocol, according to techniques known in the art.

At network startup, no predefined inter-domain label-switched paths are installed between the mobile domains V1, V2 and the primary domains C1, C2, C3.

According to a preferred embodiment of the present disclosure, packets routing between any couple of primary domain Cj and mobile domain Vi is performed with the intermediation of a primary border node SjB, suitably selected from the Nj label-switched nodes of the primary domain Cj and of a mobile border node MiB, suitably selected from the Mi mobile label-switched nodes mobile domain Vi.

When the topology of the network 1 changes for any reason, the FIBs of the label-switched nodes involved in the change are suitably reconfigured in order to adapt to the new network topology.

In a mobility scenario, wherein there is a relative motion of any mobile domain Vi with respect to the primary domains C1, C2, C3, the FIBs reconfiguration should be performed any time, for any reason, a link between a current primary border node SjB and a current mobile border node MiB is not any more feasible and a new link between a new primary border node SjB' and a new mobile border node MiB' has to be created.

In order to guarantee full network reachability and manage network reachability information in this mobility scenario, the present disclosure provides a two-level hierarchical design having a top level and a bottom level.

The bottom level is represented by inter-domain LSPs established between the Vi-LERs and Cj-LERs of the mobile domains Vi and primary domains Cj, which are dynamically connected to each other, each time, via the intermediation of a current couple of current primary border node SjB and current mobile border node MiB. An exemplary LSP is schematically shown in FIG. 1 by an arrow connecting C1-LER to V1-LER.

The top level is represented by inter-domain LSPs established between the G-LER and the Cj-LER of each primary domains Cj. This is schematically shown in FIG. 1 by arrows connecting the G-LER to the Cj-LERs. The G-LER located in the core network 10 interconnects the P primary domains C1, C2, C3 and acts as an aggregator for all traffic directed to/from the mobile domains V1, V2. By means of a route update signaling mechanism, described in detail later on, the G-LER has full reachability information enabling it to reach all the mobile domains V1, V2 via the proper LSPs/Cj-LER. In particular, for each mobile domain Vi, the G-LER is anytime aware of the primary domain Cj which is currently connected/linked to the mobile domain Vi.

In order to be transmitted over the Layer-3 network, among different IP subnets and possibly the public Internet, the Layer-2 LSPs established between the G-LER and the Cj-LERs should be encapsulated in suitable Layer 2-over-Layer 3 tunnels enabling Layer-2 packets to be transported over the Layer-3 (e.g. IP) network. Said Layer 2-over-Layer 3 tunnels must be created prior to installing each (G-LER, Cj-LER) Layer-2 LSP at network startup. Any suitable method can be used to set up and manage said Layer 2-over-Layer 3 tunnels, and the particular technique adopted is outside the scope of the present disclosure.

For example, a protocol according to IETF standard L2TPv3 (Layer 2 Tunneling Protocol Version 3) can be adopted as Layer 2-over-Layer 3 tunneling protocol, however any other suitable protocol such as GRE (Generic Routing Encapsulation) protocol can be employed.

No Layer 2-over-Layer 3 tunnels are required to install the Cj-LER-Vi-LER label switched paths because end-to-end Layer-2 connectivity is available between the primary and the mobile domains through the wireless channel Fv.

In order to guarantee full network reachability and manage network reachability information in the above-mentioned mobility scenario, the network routing information is configured as follows.

Core Network 10

IP subnet prefix: G-IP (e.g. 192.168.0.0/24)

Default gateway Core-GW configuration includes a set of static routes to the G-LER for all mobile domain subnets; in other words it is configured to send all packets received by it and directed to a mobile domain Vi of the K mobile domains V1, V2, V3 to the G-LER.

The G-LER has FIB tables suitably configured and updated to enable the G-LER to send all packets directed to a mobile domain Vi via the primary domain Cj, which is currently connected/linked to the mobile domain Vi.

Backbone 400

The backbone is a Layer-3 network that enables the default gateway Core-GW of the core network 10 and the default gateway Cj-GW of the primary domains Cj to communicate using standard IP routing.

Primary Domain Cj

IP subnet prefix: Cj-IP1 (e.g. 192.168.10.0/24).

Default gateway Cj-GW may be configured to send all traffic directed to a mobile domain Vi to Core-GW (which, in turn, has a static route to the G-LER), the Core-GW being reachable through conventional IP routing in the backbone 400.

According to an alternative, the default gateway Cj-GW may be configured to send all traffic directed to a mobile domain Vi to the respective Cj-LER (which is directly connected to the G-LER via the respective LSP), and any other unknown destination address to Core-GW.

The Cj-LER has FIB tables suitably configured and updated to enable the Cj-LER:

to send packets directed to any currently connected/linked mobile domain Vi to the respective Vi-LER via the LSP connecting the Cj-LER to the Vi-LER;

to preferably send packets directed to any label switched nodes (other than the Vi-LER, e.g. M12, M13, M22 or M23) of the currently connected/linked mobile domain Vi directly to said label switched node (without passing via the respective Vi-LER) via the LSP connecting the Cj-LER to said label switched node;

to send any packet directed to the G-LER via the LSP connecting the Cj-LER to the G-LER;

to send—as default route—any destination address that is unknown to its FIB tables to the G-LER via the respective LSP connecting said Cj-LER to the G-LER.

Mobile Domain Vi

IP subnet prefix: Vi-IP1 range.

Vi-GW router is configured with a default route to the Vi-LER. Vi-GW router may be connected to additional LANs corresponding to Vi-IPx subnet prefixes so that packets to said subnets are routed via an appropriate LAN interface of the Vi-GW router.

The Vi-LER has FIB tables suitably configured and updated to enable the Vi-LER:

to send packets directed to any currently connected/linked primary domain Cj to the respective Cj-LER via the LSP connecting said Cj-LER and Vi-LER;

to send packets directed to any additional internal mobile domain subnets Vi-IPx (e.g. Vi-IP2, etc) to the on-board router Vi-GW.

to send—as default route—any destination addresses unknown to his FIB tables (including those relating to any other mobile domain or any primary domain not currently connected to it) to the Cj-LER of the currently connected/linked primary domain Cj;

to preferably send packets directed to any label switched nodes (other than the Cj-LER, e.g. S12, S13, S22, S32) of the currently connected/linked primary domain Cj directly to said label switched node (without passing via the respective Cj-LER) via the LSP connecting the Vi-LER to said label switched node.

Other internal Vi-IPx subnets: devices belonging to any additional subnets located on the mobile domain Vi are configured with a default route to Vi-GW.

In a mobility scenario, any time there is a relative motion of any mobile domain Vi with respect to the primary domains C1, C2, C3, in order to guarantee full network reachability and manage network reachability information, a handoff procedure is performed according to the present disclosure, as disclosed in detail below.

The mobile label-switched nodes M11, M12, M13, M21, M22, M23 of the mobile domains Vi, V2, the G-LER, and the label-switched nodes S11, S12, S13, S21, S22, S31, S32, of the primary domains C1, C2, C3 advantageously comprise at least one processor coupled to one or more network interfaces and a memory that stores a process (e.g., software and/or firmware modules) that, when executed, is configured to perform any or all of the techniques in the present disclosure.

Handoff Procedure

Let's assume that at a certain time mobile domain V1 is connected to primary domain C1 via a current primary border node S1B and a current mobile border node M1B.

Let also be S11 the C1-LER of C1 and M11 the V1-LER of Vi.

The complete handoff procedure can be split in two steps: 1) a local procedure, which is used to create updated LSPs between the mobile domain V1 and the primary domain C1 (INTRA-CLUSTER handoff) or to create new LSPs between the mobile domain V1 and any other primary domain C2, C3 (INTER_CLUSTER handoff); and 2) a global procedure, which is used to propagate the reachability information of mobile domain V1 to the G-LER and to all primary domains C1, C2, C3.

Local Procedure

According to an embodiment of the present disclosure, for mobile domain V1 and primary domains C1, C2, C3, current primary border node S1B and current mobile border node M1B are dynamically selected among the mobile label-switched nodes M11, M12, M13 and the label-switched nodes S1, S12, S13, S21, S22, S31, S32 in a continuous process. The mobile label-switched nodes M11, M12, M13, which operate on the wireless channel Fv, continuously monitor the quality of the wireless signals received from each node S1, S12, S13, S21, S22, S31, S32 of the primary domains C1, C2, C3, which also operate on said wireless channel Fv.

Said mobile label-switched nodes M11, M12, M13 periodically send (e.g. every 100 ms) to a specific node, designed among M11, M12, M13 to act as a mobile domain master node M1M, a message containing the wireless link quality statistics collected in the last time span. The master node M1M collects and merges the messages received from said mobile label-switched nodes M11, M12, M13 and, optionally, also data from its own measurements, and it processes the aggregated data to determine a couple of nodes (M1B, SjB) which provides at any given time an optimal connection quality according to a predetermined metric (e.g., in term of signal strength P or other metrics) between the mobile domain V1 and any of the primary domains C1, C2, C3 currently within the communication range.

When the current couple (M1B, S1B) changes into a new couple (e.g. into M1B', S1B'), and the new primary border node S1B' belongs to the same primary domain C1 of the current primary border node S1B, an INTRA-CLUSTER hand-off is performed and only a local handoff procedure is executed.

This means that reachability information (FIB) updates are confined within the primary domain C1 and mobile domain V1 and no changes outside C1 and V1 are required, so there is no need to execute the global procedure.

On the other side, when the current couple (M1B, S1B) changes into a new couple (e.g. into M1B', S2B'), and the new primary border node S2B' belongs to a new primary domain, e.g. C2, with respect to the current primary border node S1B, an INTER-CLUSTER hand-off is performed, and both local and global handoff procedures are executed.

Indeed, in this case, reachability information (FIB) updates are extended to all primary domains C1, C2, C3 as well as to the G-LER.

In any case, when the new mobile border node M1B' is selected, it receives a notification message from the master node MM, recognizes itself as the newly elected mobile border node, and runs a local handoff procedure for establishing a label switched connection with the new primary border node (e.g. S1B' or S2B').

The local handoff procedure comprises three main phases: 1) a handoff request phase performed by the new mobile border node M1B'; 2) a handoff response phase performed by new the primary border node (e.g. S1B' or S2B'); and 3) a handoff notification phase, performed independently both by the new mobile border node M1B' and the new the primary border node (e.g. S1B' or S2B').

Figure 2:
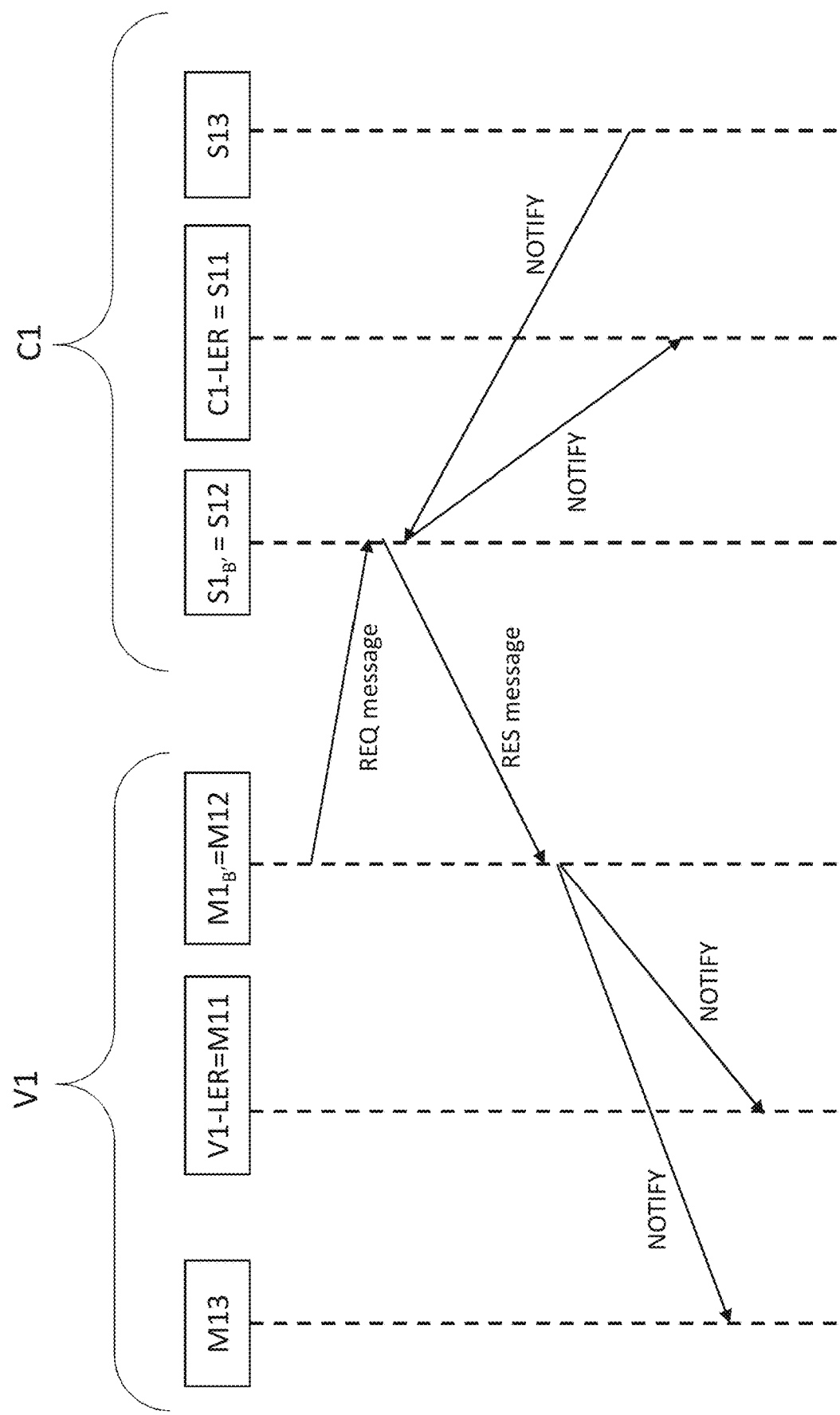
FIG. 2 shows an example flow of messages exchanged during a local handoff procedure, according to an embodiment of the present disclosure.

The flow of messages exchanged during the three phases is illustrated schematically by the diagram of FIG. 2.

In the example of FIG. 2 an INTRA-CLUSTER hand-off is considered wherein the new primary border node is S1B' (which corresponds to S12) and M1B' corresponds to M12.

The handoff request phase comprises the transmission of a signaling REQ (request) message from the new mobile border node M1B' to the new primary border node S1B'. Such REQ message is preferably sent over the wireless channel Fv directly to the Layer-2 MAC address of the primary border node S1B', since it is assumed that, due to service disruption caused by mobility, the standard IP routing layer can be unable to deliver data during the handoff transitory.

The REQ message preferably comprises the following information: M1B'_MAC; MD_ID; SEQ_NUM; MDL_LIST.

MB'_MAC is the MAC address of the wireless radio interface of the mobile border node M1B'.

MD_ID (Mobile Domain IDentifier) is a unique identifier, which can be an integer number assigned (for example by the network administrator) to the mobile domain V1 (it has the same value for all the mobile label-switched nodes M11, M12, M13 of the mobile domain V1).

SEQ_NUM is a sequence number received from the master node MM.

MDL_LIST (Mobile Domain Label List) comprises M1 (in the example M1=3) labels to be used by the primary border node S1B' to respectively forward packets, via the mobile border node M1B', to M11, M12, M13.

According to the present disclosure, the REQ message also comprises a V-LER_ID, as for example a MPLS label associated to the V1-LER of the mobile domain V1, and a list MDS_LIST (Mobile Domain Subnet list) of any FEC relating to any on-board IP subnets (e.g. V1-IP1 and V1-IP2) present in the mobile domain, to be used by the primary border node S1B' to respectively forward packets, via the mobile border node M1B', to the V1-LER for FEC=FEC_V1-LER and for any FEC relating to the on-board IP subnets (e.g. V1-IP1 and V1-IP2) present in the mobile domain V1.

When the primary border node S1B' receives the REQ message sent by the mobile border node M1B', it performs the handoff response phase, preferably according to the following actions:

It checks the validity of the received handoff sequence number SEQ_NUM for the particular mobile domain V1 (identified by MD_ID). If the message is found to be old or a duplicate, it is discarded. This check and the use of the SEQ_NUM parameter can be useful for discarding old or duplicate handoff request messages.

It sends a signaling RES (response) message to the mobile border node M1B'. Similarly, as above, this message is preferably sent directly to the Layer-2 MAC address of the mobile border node M1B' via the wireless link. The RES message preferably comprises the following information: SEQ_NUM (that is, the sequence number as received in the REQ message) and PDL_LIST. The PDL_LIST (Primary Domain Label List) parameter comprises N1 labels to be used by the mobile border node M1B' to respectively forwards packets, via the primary border node S1B', to the N1 label-switched nodes S11, S12, S13 of primary domain C1 (in the example N1=3). Optionally, the RES message may also comprise the PD_ID (that is a unique identifier, which can be an integer number, assigned to the primary domain C1). Furthermore, according to the present disclosure, the RES message comprises a C1-LER_ID, as for example a MPLS label associated to the C1-LER of the mobile domain C1, and the FEC corresponding to the C1-IP1 subnet, to be used by the mobile border node M1B to respectively forwards packets, via the primary border node S1B', to the C1-LER for any unknown address and in association with FEC=C1-IP1.

It uses the M1 labels received in the MDL_LIST and the other parameters of the REQ message for configuring/updating its FIB tables with appropriate entries. As explained in more detail below, such entries determine the installation of individual LSPs from the primary border node S1B' towards the M1 mobile nodes M11, M12, M13.

Preferably, step 2) is performed before step 3) in order to avoid any delay in sending the RES message to the mobile border node M1B'.

When the mobile border node M1B' receives the RES message from the primary border node S1B', it performs the following actions:

It checks the validity of the received sequence number SEQ_NUM by matching it with the value transmitted into the REQ message. If the message is found to be old or a duplicate, it is discarded.

It uses the N1 labels received in the PDL_LIST and the other parameters of the RES message for configuring/updating its FIB tables with appropriate entries. As explained in more detail below, such entries determine the installation of individual LSPs from the mobile border node M1B' towards the N1 primary nodes S11, S12, S13.

The handoff notification phase is executed by the primary border node S1B' and the mobile border node M1B' with the purpose of distributing handoff configuration data amongst the other label switched nodes (S11, S13, and M11, M13) in the primary domain C1 and mobile domain V1, respectively, which do not directly participate in the handoff procedure between S1B' and M1B'. Preferably, the primary border node S1B' executes the handoff notification phase right after sending the RES message (that is, after action 2) and before action 3) above mentioned), while the mobile border node M1B' preferably executes the handoff notification phase right after reception of the RES message received from S1B' (that is, after action 1') and before action 2') above mentioned).

The handoff notification phase comprises the transmission of a NOTIFY message to the other label switched nodes. In the example of FIG. 2, the primary border node S1B' sends a NOTIFY message to S11 and S13, and the mobile border node M1B' sends a NOTIFY message to M11 and M13.

The NOTIFY message sent by the primary border node S1B' advantageously comprises the following information: SEQ_NUM (that is, the sequence number as received in the REQ message) and PDSL_LIST. The PDSL_LIST (Primary Domain Stacking Label List) parameter comprises M1 stacking labels allocated to the M1 mobile label-switched nodes, which enable the notified label switched nodes of the primary domain C1 (in the example S11 and S13) to forward packets, via the primary border node S1B' (in the example, S12), directly to the M1 mobile label-switched nodes (in the example, M11, M12 and M13).

Moreover, according to the present disclosure, the NOTIFY message also comprises the stacking label associated to the V1-LER of the mobile domain V1, and the list MDS_LIST (Mobile Domain Subnet list) of any FEC relating to any on-board IP subnets (e.g. V1-IP1 and V1-IP2) present in the mobile domain V1, which enable the notified label switched nodes of the primary domain C1 (in the example S11) to forward packets, via the primary border node S1B' (in the example, S12), to the V1-LER for any FEC relating to the on-board IP subnets (e.g. V1-IP1 and V1-IP2).

The NOTIFY message sent by the mobile border node M1B' advantageously comprises the following information: SEQ_NUM (that is, the sequence number as sent in the REQ message) and MDSL_LIST. The MDSL_LIST (Mobile Domain Stacking Label List) parameter comprises N1 stacking labels allocated to the N1 primary label-switched nodes, which enable the notified mobile label switched nodes of the mobile domain V1 (in the example M11 and M13) to forward packets, via the mobile border node M1B' (in the example, M12), directly to the N1 primary label-switched nodes (in the example, S11, S12 and S13.

Moreover, according to the present disclosure, said NOTIFY message also comprises the stacking label associated to the C1-LER of the primary domain C1 and the FEC corresponding to the C1-IP1 subnet, which enable the notified mobile label switched nodes of the mobile domain V1 (in the example M11) to forward packets, via the mobile border node M1B' (in the example, M12) to the C1-LER for any unknown address and for the FEC corresponding to the C1-IP1 subnet.

When a label-switched node (in the example, M11, M13, S11, S13) receives a NOTIFY message, it preferably performs the following actions:

It checks the validity of the received sequence number SEQ_NUM for the specific mobile domain V1 identified by MOB_ID. If the message is old or a duplicate, it is discarded.

It uses the information received in the NOTIFY message for configuring/updating its FIB tables with appropriate entries. As explained in more detail below, such entries suitably determine the installation of individual LSPs from the N1 label-switched nodes the M1 mobile label-switched nodes via the couple S1B'-M1B' and, vice versa, from the M1 mobile label-switched nodes to the N1 label-switched nodes via the couple M1B'-S1B'. Such LSPs all include a link between S1B' and M1B', in both directions.

In addition, according to the present disclosure, each label switched node S11, S12, S13 of primary domain C1 uses the label associated to the V1-LER of the mobile domain V1 to install a FEC into its FTN table to match any IP subnet prefix (e.g. V1-IPx) advertised in the REQ/NOTIFY message. In this way, all packets directed to any on-board IP subnet prefix (e.g. V1-IP1 and V1-IP2) will be forwarded to the V1-LER of the mobile domain V1.

Moreover, according to the present disclosure, each mobile label switched node M11, M12, M13 of mobile domain V1 uses the label associated to the C1-LER of the primary domain C1 a) to install a FEC into its FTN table to match IP subnet prefix C1-IP1 of primary domain C1 advertised in the RES/NOTIFY message, and b) to install a FEC into its FTN table to match all unknown destination IP subnets (default route). This includes, for example, all traffic directed to a public internet address or to a core network subnet. In this way, all packets directed to the IP subnet prefix C1-IP1 as well as to any unknown destination IP subnets will be forwarded to the C1-LER of the primary domain C1.

Global Procedure

This procedure is started by the Cj-LER of a primary domain Cj. The Cj-LER is able to detect that an INTER-CLUSTER handoff is occurring by examining the advertised IP subnet prefixes when it receives a handoff NOTIFY message from a primary border node of the primary domain Cj or a direct handoff REQ message from a mobile border node of mobile domain Vi. If the advertised IP subnet prefixes are not found by the Cj-LER in its FTN table, it means that the mobile domain Vi was previously connected to a different, previous primary domain Cj. In this case, the Cj-LER executes the global handoff procedure to notify the G-LER that the mobile domain Vi is now reachable via such new Cj-LER. On the other hand, if the advertised IP subnet prefixes are found in the FTN table of the Cj-LER, it means that the mobile domain Vi was already connected to primary domain Cj. In this case, only the local handoff procedure is executed.

Figure 3:
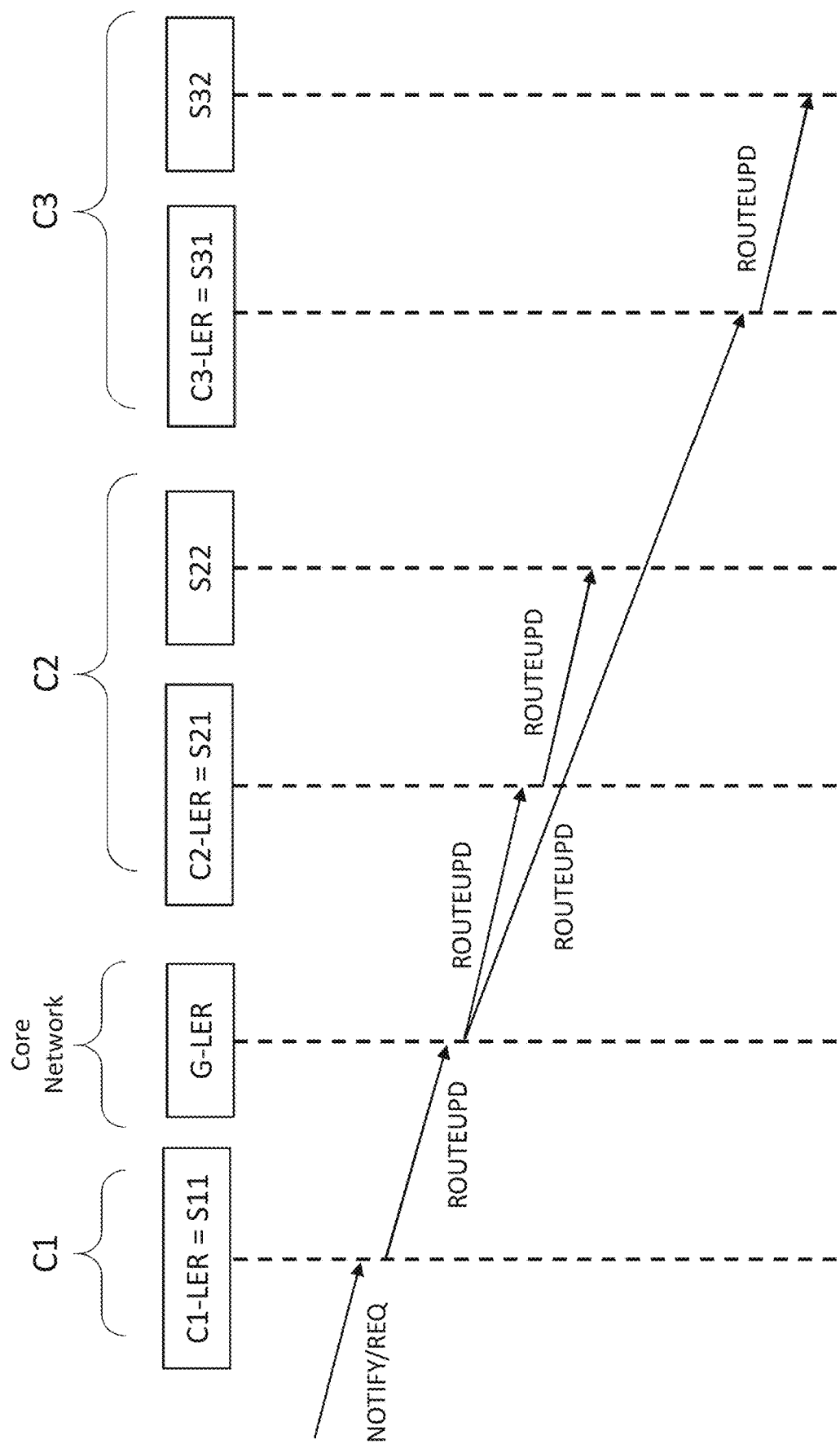
FIG. 3 shows an example flow of messages exchanged during a global handoff procedure, according to an embodiment of the present disclosure.

The messages exchanged to execute the global procedure are schematically illustrated in FIG. 3.

In the example of FIG. 3, the global procedure is started by the C1-LER of primary domain C1 when it receives a handoff NOTIFY message from a primary border node of the primary domain C1 or a direct handoff REQ message from a mobile border node of mobile domain Vi.

The C1-LER sends a ROUTEUPD message to the G-LER. The ROUTEUPD message includes an association between the IP subnet prefix (e.g. V1-IP1 and V1-IP2) of any on-board IP subnets advertised by the mobile domain V1 and the C1-LER's ID (e.g. MPLS label). This message is sent through the LSP installed between the C1-LER and the G-LER over the Layer 2-over-Layer 3 tunnel.

Upon reception of the ROUTEUPD message, the G-LER uses the C1-LER's ID to update a FEC into its FTN tables to match the IP subnet prefix (e.g. V1-IP1 and V1-IP2) advertised in the ROUTEUPD message.

Subsequently, the G-LER sends another ROUTEUPD message to the C2-LER and C3-LER of the other primary domains C2 and C3 as shown in FIG. 3. Also, this ROUTEUPD message includes the IP subnet prefix (e.g. V1-IP1 and V1-IP2) of any on-board IP subnets advertised by the mobile domain V1. However, in this case the associated Cj-LER ID is NULL, so that the recipients will delete all FIB entries (particularly in the FTN) relating to mobile domain V1. Consequently, any traffic originating from the local subnet of primary domains C2 and C3 or from a locally-connected mobile domain (different from V1, e.g. V2) and directed to mobile domain V1 will be sent to the G-LER, which acts as the default gateway for all mobile primary domains Vi, V2.

To ensure consistency across the whole network, the C2-LER and C3-LER forward the same ROUTEUPD message to the other label-switched nodes (e.g. S21 and S32) of the same primary domain C2 and C3, which apply the same changes to their FIBs.

Concerning the packets to be sent between a mobile domain Vi and a primary domain Cj through LSPs, it is noted that said packets are marked, for part of the LSP, using two stacked labels by means of label stacking.

Figure 4:
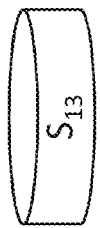
FIG. 4 shows an example of packet forwarding through a label switched path (LSP) from a label-switched node to a mobile label-switched node.
Figure 4:
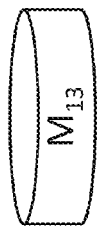
Figure 4:
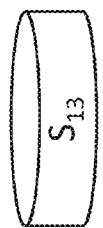
Figure 4:
Figure 4:
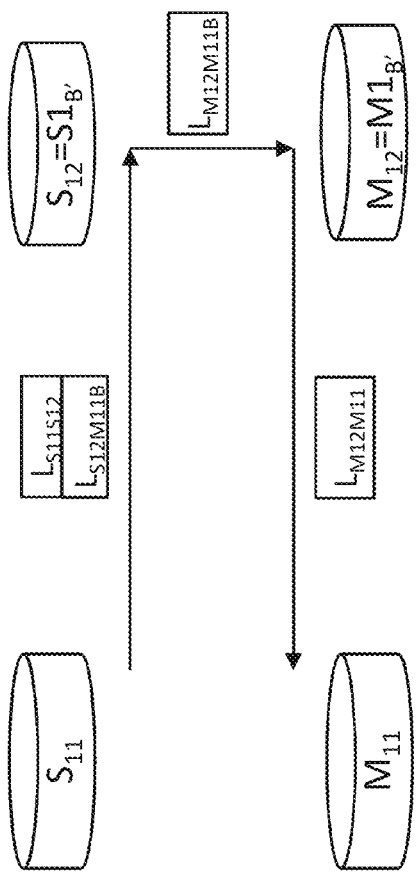

In particular, as schematically shown in FIG. 4, a packet to be sent through an LSP from a given label-switched node (e.g. S11) to a given mobile label-switched node (e.g. M11) is advantageously marked with an inner label (e.g. LS12M11B) and an outer label (e.g. LS11S12). The outer label will correspond to the intra-primary-domain label to be used by S11 to forward packets to S1B' (e.g. S12) via an intra-primary-domain LSP in the primary domain C1. The inner label will correspond to the stacking label, received by S11 in the NOTIFY message, enabling S11 to forward packets to M11 via the link S1B'-M1B'. When, through the intra-primary-domain LSP, the packet reaches S1B', the latter pops (that is, remove) the outer label (e.g. LS11S12) and swaps the inner label (e.g. LS12M11B) with the label (e.g. LM12M11B) of the labels received in the REQ message that enables S1B' to forward the packet to M11 via M1B'. When M1B' receives the packet, it swaps the current label (e.g. LM12M11B) with the intra-mobile-domain label (e.g. LM12M11) enabling M1B' to forward packets to M11 through an intra-mobile-domain LSP in the mobile domain V1.

Figure 5:
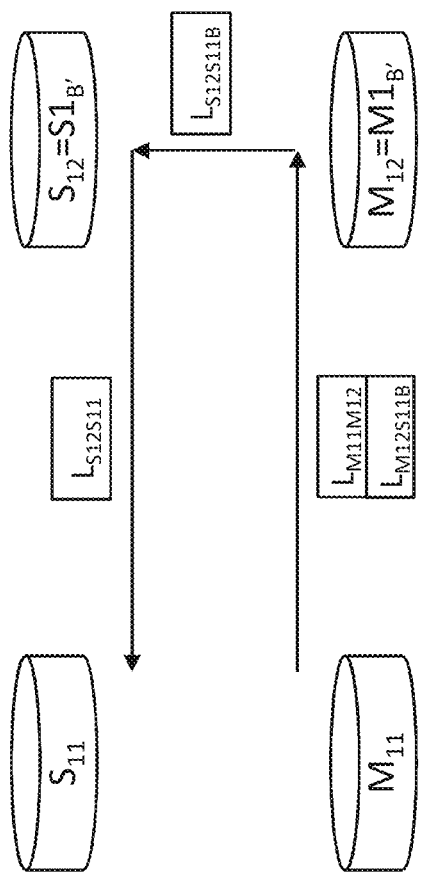
FIG. 5 shows an example of packet forwarding through an LSP from a mobile label-switched node to a label-switched node.

Similarly (as schematically shown in FIG. 5), a packet to be sent through a LSP from a given mobile label-switched node (e.g. M11) to a given primary label-switched node (e.g. S11) is advantageously marked with an inner label (e.g. LM12S11B) and an outer label (e.g. LM11M12). The outer label will correspond to the intra-mobile-domain label enabling M11 to forward packets to M1B' (e.g. M12) via an intra-mobile-domain LSP within the mobile domain Vi. The inner label will correspond to the stacking label, as received by M11 in the NOTIFY message, to be used by M11 to forward packets to S11 via the link M1B'-S1B'. When, through the intra-mobile-domain LSP, the packet reaches M1B', the latter pops the outer label (e.g. LM11M12) and swaps the inner label (e.g. LM12S11B) with the label (e.g. LS12S11B) of the labels received in the RES message that enables M1B' to forward the packet to S11 via S1B'. When S1B' receives the packet, it swaps the current label (e.g. LS12S11B) with the intra-primary-domain label (e.g. LS12S11) enabling S1B' to forward packets to S11 through an intra-primary-domain LSP in the primary domain C1.

FIGS. 6 to 9 schematically show examples of FIB tables in the case of a primary domain C1 comprising two label-switched nodes S11 and S12 and of a mobile domain V1 comprising two label-switched nodes M1 and M2.

In each of S11, S12, M1, M2 the FIB tables comprise an FTN (FEC to NHLFE) table, an ILM (Incoming Label Mapping) table and a NHLFE (Next Hop Label Forwarding Entry) table.

The FTN tables provide correspondences between predetermined FECs and predetermined indexes (NHLFE in) to be used as access keys to the NHLFE table.

The ILM tables provide correspondences between predetermined input labels (LABEL IN) and predetermined indexes (NHLFE in) to be used as access key to the NHLFE table.

In correspondence of each index (NHLFE in), the NHLFE tables provide information about operation to be performed on input label (Label OP), about the output label to be used (Label OUT) and about the next-hop node for packet forwarding (Next).

Figure 6:
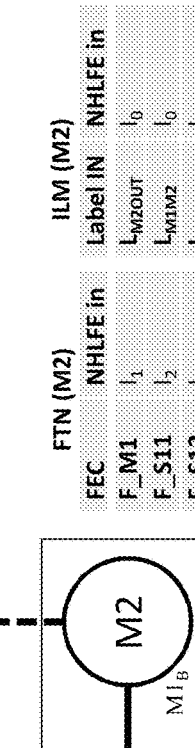
FIGS. 6-9 schematically show examples of forwarding information base (FIB) tables during operation.
Figure 6:
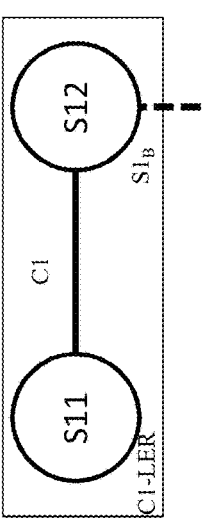
Figure 6:
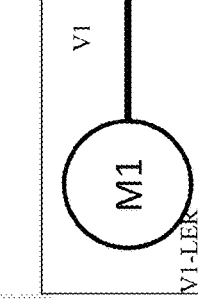

FIG. 6 represents a situation wherein at a certain time mobile domain V1 is connected to primary domain C1 via S12 as current primary border node S1B and M2 as current mobile border node M1B. It is also assumed that S11 is the C1-LER of C1 and M11 is the V1-LER of V1. Let also be node G1 (mentioned in the tables and shown in FIGS. 7-8)

the G-LER of the core network 10, C1_IP1 the subnet prefix of the subnet of C1, and V1_IP1 and V1_IP2 the IP subnet prefixes of on-board subnets of V1.

In this example of FIG. 6, intra-primary-domain LSPs are pre-installed within the primary domain C1 (between S11 and S12) and intra-mobile-domain LSPs are pre-installed within the mobile domain Vi (between M1 and M2). Moreover, following to a local handoff procedure between S12 and M2, LSPs are installed between the primary domain C1 and the mobile domain V1 via the primary/mobile border nodes S12 and M2.

As shown in FIG. 6, during the local handoff procedure:

The REQ message from M2 to S12 comprises: a label LM2OUT in association with FEC=F_M2, a label LM2M1B in association with FEC=FEC_M1 and with V1-LER; and the MDS_LIST (Mobile Domain Subnet list) of any FEC relating to any on-board IP subnets (e.g. V1-IP1 and V1-IP2) of V1.

The RES message from S12 to M2 comprises: label LS12OUT in association with FEC=F_S12, label LS12S11B in association with FEC=FEC_S11 and with C1-LER; and the FEC corresponding to the C1-IP1 subnet.

The NOTIFY message from S12 to S11 comprises: stacking label LS12M1B in association with FEC=F_M1 and with V1-LER, stacking label LS12M2B in association with FEC=F_M2, and the MDS_LIST (Mobile Domain Subnet list) of any FEC relating to any on-board IP subnets (e.g. V1-IP1 and V1-IP2) of V1.

The NOTIFY message from M2 to M1 comprises: stacking label LM2S11B in association with FEC=F_S11 and C1-LER; stacking label LM2S12B in association with FEC=F_S12, and the FEC corresponding to the C1-IP1 subnet.

During the local handoff procedure, the FIB tables on S11, S12, M1, M2 are adjusted with updated entries, adapted to install the new LSPs between the primary domain C1 and the mobile domain V1 via the primary/mobile border nodes S12 and M2. The results of such adjustments are shown in the tables of FIG. 6.

According to the table FTN of S11 (FTN(S11)):

At the receipt of a packet with FEC=F_S12, S11 will access the NHLFE table with the index I1, will PUSH (that is assign) label LS11S12 to the packet and will send it to node S12.

At the receipt of a packet with FEC=F_G1, S11 will access the NHLFE table with the index IG, will PUSH (that is assign) label LS11G1 to the packet and will send it to node G1 (G-LER).

At the receipt of a packet with FEC=M1, S11 will access the NHLFE table with the index I2, will PUSH (that is assign) the (inner) label LS12M1B to the packet, will access the NHLFE table again with the index I1, will PUSH (that is assign) the (outer) label LS11S12 to the packet, and will send the packet to node S12.

At the receipt of a packet with FEC=F_M2, S11 will access the NHLFE table with the index I3, will PUSH (that is assign) the (inner) label LS12M2B to the packet, will access the NHLFE table again with the index I1, will PUSH (that is assign) the (outer) label LS11S12 to the packet, and will send the packet to node S12.

At the receipt of a packet with FEC=V1_IP1, S11 will access the NHLFE table with the index I2, will PUSH (that is assign) the (inner) label LS12M1B to the packet, will access the NHLFE table again with the index I1, will PUSH (that is assign) the (outer) label LS11S12 to the packet, and will send the packet to node S12.

At the receipt of a packet with FEC=V1_IP2, S11 will access the NHLFE table with the index I2, will PUSH (that is assign) the (inner) label LS12M1B to the packet, will access the NHLFE table again with the index I1, will PUSH (that is assign) the (outer) label LS11S12 to the packet, and will send the packet to node S12.

At the receipt of a packet with FEC=default, S11 will access the NHLFE table with the index IG, will PUSH (that is assign) label LS11G1 to the packet and will send it to node G1 (G-LER).

According to the table ILM of S11 (ILM(S11)):

At the receipt of a packet with input label LS11OUT, S11 will access the NHLFE table with the index I0 and will POP (that is remove) label LS11OUT from the packet and will pass the packet to upper layers of the network.

At the receipt of a packet with input label LS12S11, S1 will access the NHLFE table with the index I0 and will POP label LS12S11 from the packet and will pass the packet to upper layers of the network.

At the receipt of a packet with input label LS11S12B, S1 will access the NHLFE table with the index I1B, will SWAP (that is change) the label LS11S12B into LS11S12 and will send the packet to node S12.

At the receipt of a packet with input label LG1S11, S11 will access the NHLFE table with the index JO, will POP label LG1S11 from the packet and will send it to the upper layer of the network.

At the receipt of a packet with input label LS11M1B, S11 will access the NHLFE table with the index I2B, will SWAP (that is change) the label into LS12M1B, will access the NHLFE table again with the index I1, will PUSH (that is assign) the (outer) label LS11S12 to the packet, and will send the packet to node S12.

At the receipt of a packet with input label LS11M2B, S11 will access the NHLFE table with the index I3B, will SWAP (that is change) the label into LS12M2B, will access the NHLFE table again with the index I1, will PUSH (that is assign) the (outer) label LS11S12 to the packet, and will send the packet to node S12.

Similar observations apply to the tables of S12, M1, M2.

In general, it is noted that the FEC=default is used to indicate all unknown IP prefixes, not present in the respective FTN. It is also noted that FEC=default is not present in the FTN table of S12 because all unknown IP prefixes, not present in the FTN of this node are forwarded to the C1-GW. Indeed, for the purpose of managing the traffic between the mobile domain V1 and the rest of the network 1, S12 is only an intermediary node (between the C1-LER S11 and the mobile domain V1), and its default route needs not to be consulted to forward such traffic.

Figure 7:
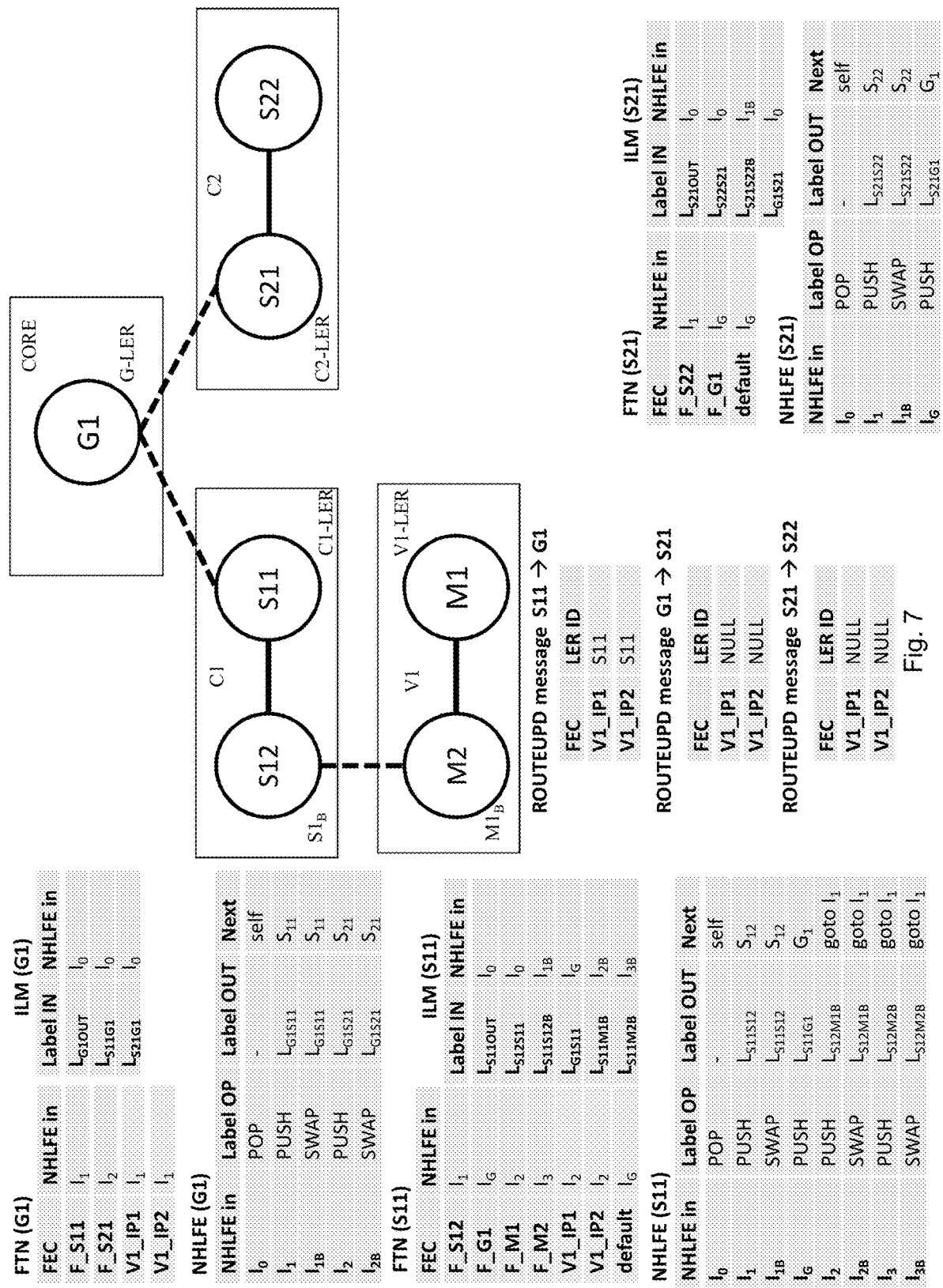

FIG. 7 represents the same situation of FIG. 6, wherein the G-LER (G1) and primary domain C2 are also shown. Regarding primary domain C2, it assumed that it comprises two label-switched nodes S21 and S22 and that S21 is the C2-LER of C2. Two LSPs are installed respectively between the G-LER and the C1-LER and between the G-LER and the C2-LER, over the Layer 2-over-Layer 3 tunnels.

In the situation of FIG. 7, it is assumed that a global handoff procedure was executed by C1-LER to notify the G-LER that the mobile domain V1 is connected to primary domain C1 via the C1-LER, and that ROUTEUPD messages were exchanged.

In particular, as shown in FIG. 7, during the global handoff procedure:

In the ROUTEUPD message from S11 to G1, the ID of S11 is sent as LER ID in association with FEC=V1_IP1 and FEC=V1_IP2. The ID of S11 may be a MPLS label (e.g. LG1S11) or the IP address of S11.

In the ROUTEUPD message from G1 to S21, a NULL value is sent as LER ID in association with FEC=V1_IP1 and FEC=V1_IP2.

In the ROUTEUPD message from S21 to S22, a NULL value is sent as LER ID in association with FEC=V1_IP1 and FEC=V1_IP2.

During the global handoff procedure, the FIB tables on G1, S11, S12, S21, S22 are changed with updated entries that enable the G-LER to reach the mobile domain V1 via the primary domain C1. The results of such adjustments are shown in the tables of FIG. 7.

According to the table FTN of G1 (FTN(G1)):

At the receipt of a packet with FEC=F_S11, G1 will access the NHLFE table with the index I1, will PUSH (that is assign) label LG1S11 to the packet and will send it to node S11 via the established LSP over the L2TP tunnel.

At the receipt of a packet with FEC=F_S21, G1 will access the NHLFE table with the index I2, will PUSH (that is assign) label LG1S21 to the packet and will send it to node S21 via the established LSP over the L2TP tunnel.

At the receipt of a packet with FEC=V1_IP1 or FEC=V1_IP2, G1 will access the NHLFE table with the index I1, will PUSH (that is assign) label LG1S11 to the packet and will send it to node S11 via the established LSP over the L2TP tunnel. In this way, all packets directed to mobile domain V1 (that is, all packets having an IP address belonging to the IP subnet prefix V1_IP1 or V1_IP2) are sent by the G-LER to the C1-LER (S11).

According to the table ILM of G1 (ILM(G1)):

At the receipt of a packet with input label LG1OUT, LS11G1 or LS21G1, G1 will access the NHLFE table with the index I0 and will POP (that is remove) said input label from the packet and will pass the packet to upper layers of the network.

Similar observations apply to the tables of S11 and S21.

It can be noted that—as primary domain C2 is no connected to any mobile domain Vi—the tables of S21 (and S22) have no entries relating to mobile domains V1 or any other mobile domain.

Figure 8:
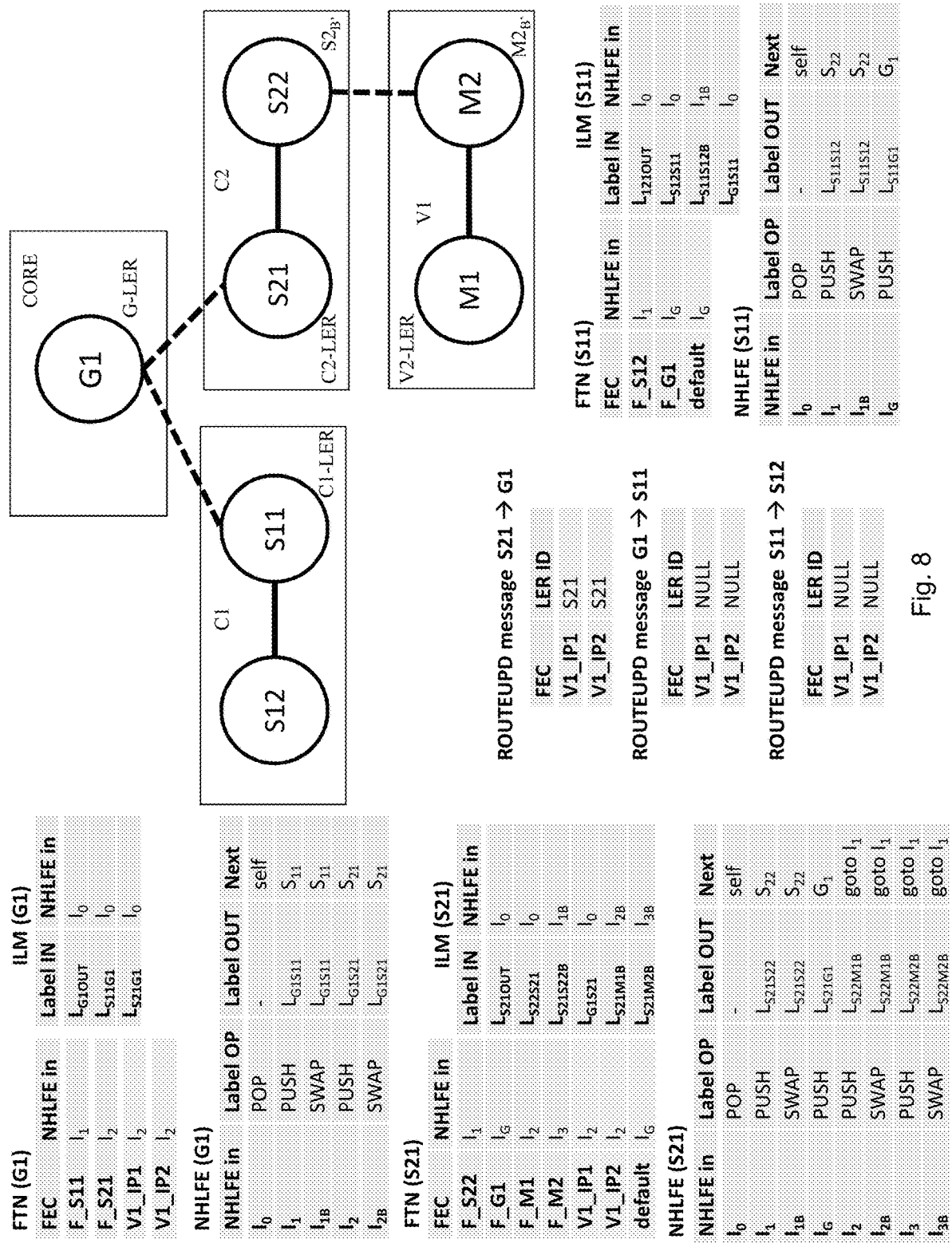

FIG. 8 represents a development of the situation of FIG. 7 wherein a global handoff procedure is executed for connecting the mobile domain V1 via the primary domain C2 (instead of the primary domain C1), wherein S22 and M2 respectively act as new primary border node S2B' and mobile border node M2B'.

In particular, in the situation of FIG. 8, it is assumed that a global handoff procedure has been executed by C2-LER (S21) to notify the G-LER that the mobile domain V1 is now connected to primary domain C2 via the C2-LER, and ROUTEUPD messages were exchanged according to the present disclosure.

In particular, as shown in FIG. 8, during said global handoff procedure:

In the ROUTEUPD message from S21 to G1, the ID of S21 is sent as LER ID in association with FEC=V1_IP1 and FEC=V1_IP2. The ID of S21 may be a MPLS label (e.g. LG1S21) or the IP address of S21.

In the ROUTEUPD message from G1 to S11, a NULL value is sent as LER ID in association with FEC=V1_IP1 and FEC=V1_IP2.

In the ROUTEUPD message from S11 to S12, a NULL value is sent as LER ID in association with FEC=V1_IP1 and FEC=V1_IP2.

Accordingly, the FIB tables on G1, S11, S12, S21, S22 are updated with entries adapted to enable the G-LER to reach the mobile domain V1 via the primary domain C2.

In particular, with respect to the situation of FIG. 7, it can be noted that—as primary domain C1 is no connected anymore to mobile domain V1—the tables of S11 (and S12) have no more entries relating to mobile domains Vi. On the other side, entries relating to mobile domains V1 have been added into the tables of S21 (and S22).

Figure 9:
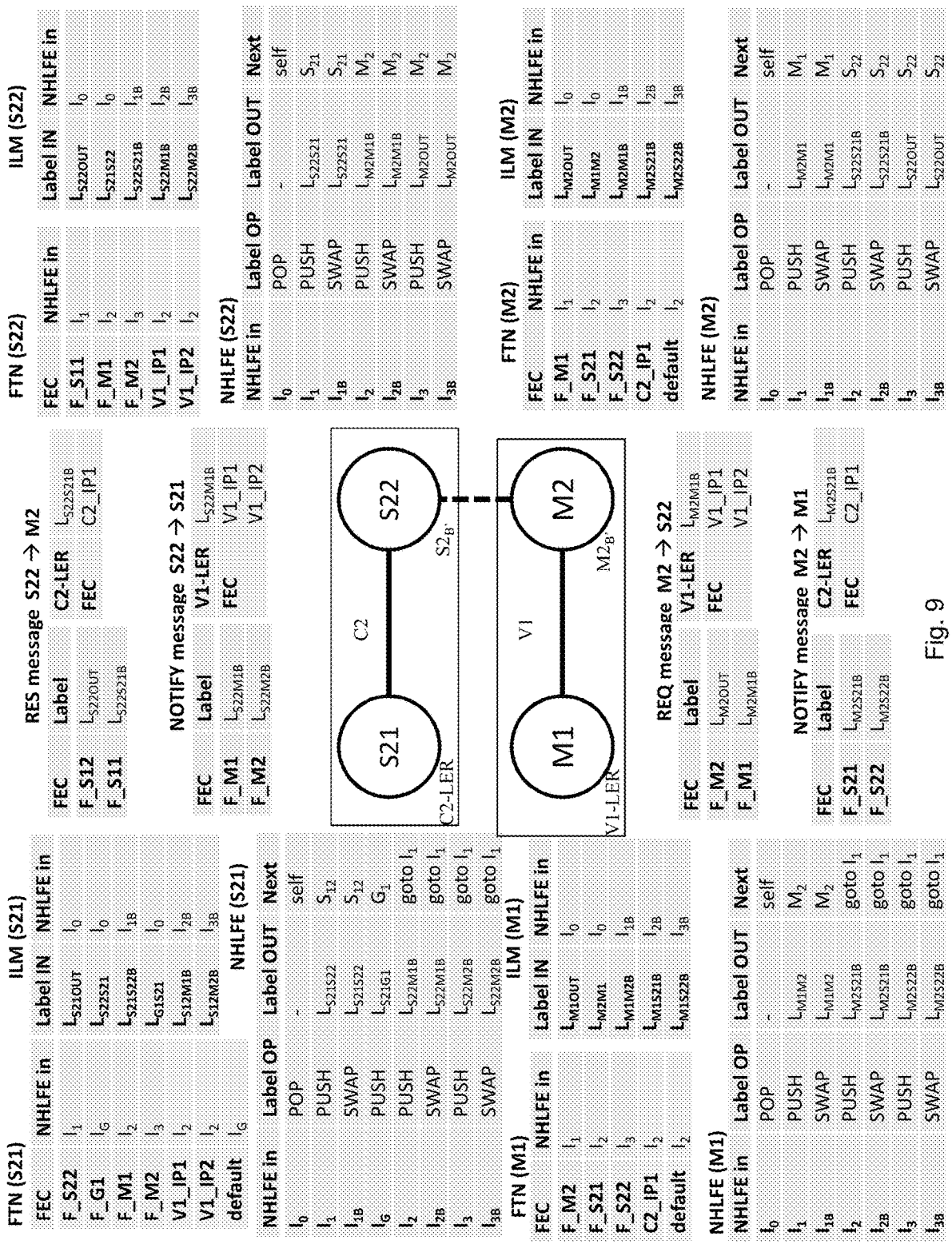

FIG. 9 represents the whole FIB tables of nodes S21, S22, M1, M2 in the situation of FIG. 8, after (besides the global handoff procedure) a local handoff procedure has been executed to connect the mobile domain V1 to the primary domain C2, via the intermediation of M2 and S22 as new primary border node S2B' and mobile border node M2B'.

The tables entries and the REQ, RES, NOTIFY messages exchanged during the local handoff procedures are similar to those already explained with reference to FIG. 6, to which reference is made.

According to the present disclosure, compared to standard MPLS data plane functions, G-LER, Cj-LER and Vi-LER units perform an additional task to send packets via two disjoint LSPs (one LSP from G-LER and Cj-LER and one LSP from Cj-LER and Vi-LER). This additional task is performed in the G-LER, Cj-LER and Vi-LER by a Mobile LSP Routing (MLR) function, as schematically shown in FIGS. 10 and 11.

More specifically, in each Cj-LER the MLR is responsible for determining whether the packet reaching the Cj-LER from the Vi-LER or the G-LER should be respectively transmitted to the G-LER or the Vi-LER via another LSP, or to the internal LAN 110.

Figure 10:
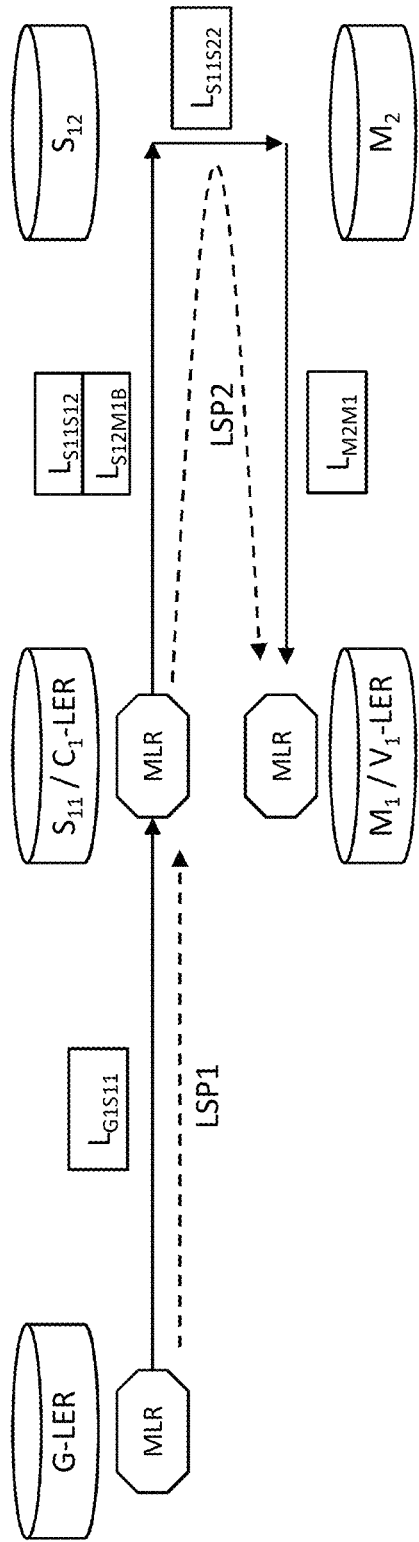
FIGS. 10-11 schematically show two disjoint LSPs and Mobile LSP Routing (MLR) functions.
Figure 11:
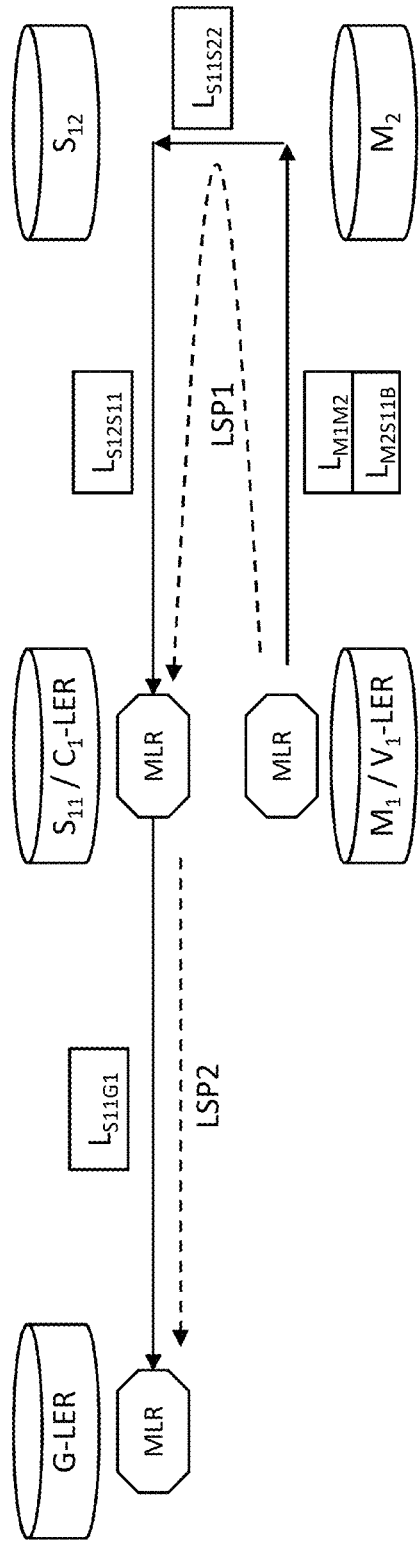

With reference to FIGS. 1, 7 and 10, let's consider a packet received by the G-LER from the core network 10 (via core-GW) and directed to a client device Dm11 connected to the on-board LAN 210 of mobile domain V1, having destination IP address belonging to the V1-IP1 range (e.g. 192.168.30.0/24). V1 is connected to primary domain C1, which is managed by the C1-LER S11, as in the situation shown of FIG. 7.

According to the tables shown in FIG. 7, the G-LER (G1) accesses the FEC table with FEC=V1_IP1 so that it will access the NHLFE table with the index I1, will PUSH (that is assign) label LG1S11 to the packet and will send it to node S11 (C1-LER) via the established LSP1 over the Layer 2-over-Layer 3 tunnel.

On the C1-LER the packet is decapsulated from the Layer 2-over-Layer 3 tunnel and then it is processed by the MLR. The MLR accesses the FEC table with FEC=V1_IP1. As such FEC=V1_IP1 is present in its FEC table, it finds out that the IP destination address with prefix V1_IP1 can be reached through an LSP to the V1-LER (M1) of mobile domain V1. So, it forward the packets to V1-LER (M1) via LSP2, using the appropriate labels that enable the packet to travel from S11 to S12, from S12 to M2, and from M2 to M1, as indicated in the tables of FIG. 7 and shown in FIG. 10. Finally, the MLR function of V1-LER (M1) inspects the packet received via the LSP2 and it determines that the IP destination address belong to the local management subnet, so it routes the packet to the LAN 210.

Note that when said IP destination address corresponds to the address of an on-board node like M2, the C1-LER (S11) can forward the packet directly to M2 (without passing via M1 as V1-LER), by accessing the FTN table of C1-LER (S11) with FEC=F_M2. In this case, the packet is not processed by V1-LER's MLR function because it is not necessary.

In another example, the IP destination address belongs to the V1-IP2 range. In this case, the MLR function of V1-LER will forward the packet via a static route to the on-board gateway V1-GW, instead of sending it to the LAN 210.

As schematically shown in FIG. 11, for upstream traffic, i.e. from the mobile domain V1 to the core network 10 or infrastructure network 100, the process is symmetric.

Note that, according to the tables of FIG. 6, on the V1-LER (M1), all non-local prefixes not present in the MPLS FIBs are sent to the current C1-LER (see FEC=default in the FTN(M1)). In turn, the C1-LER forwards any unknown, non-locally connected mobile prefixes to the G-LER (see FEC=default in the FTN(S11)). In this way, communications between mobile domains Vi that are currently connected to different primary domains Cj are enabled through the G-LER.

For different mobile domains Vi connected to the same primary domain Cj, instead, the MLR of the local Cj-LER will re-route the traffic back via the appropriate LSP of the same primary domain Cj. In this case, the traffic stays within the same primary domain Cj and the G-LER is not involved, saving bandwidth and processing resources on the backbone and core networks.

As clear from FIGS. 6 to 11, the mobility management method of the present disclosure enables to exploit and to let unchanged the intra-primary-domain/intra-mobile-domain LSPs predefined within each primary domain Vi and within each mobile domain Cj.

Changes of the network topology due to the relative motion between any mobile domain Vi with respect to primary domains Cj (that cause a local handoff from a current couple of primary border node SB and mobile border node MB into a new couple SB'-MB', and optionally a global handoff as well) are handled only by changing the rows of the FIB tables that relate to the connection between nodes belonging to different domains.

At the bottom level, considering that connection between a primary domain Cj and a mobile domain Vi is established by means of only one node (the mobile border node MB/MB') of the mobile domain Vi and only one node (the primary border node SB/SB') of the primary domain Cj, a single handoff procedure, involving a single one-hop label-switched segment (between the mobile border node MB/MB' and the primary border node SB/SB'), is sufficient to provide complete connectivity amongst the label-switched nodes and the client devices of both domains. The number of LSPs paths to be reconfigured at each local handoff procedure is thus limited.

At the top level, at any global handoff procedure, the FIB tables of the G-LER remain unchanged apart from the rows of the FTN(G1) table relating to the mobile domain Vi (last two rows with e.g. FEC=V1_IP1, FEC=V1_IP2), which need to be updated to connect to the current Cj-LER. On the other side, the FIB tables of the Cj-LER are updated to insert or cancel entries relating to the currently connected or disconnected mobile domain Vi.

Accordingly, the local and global handoff procedures performed according to the present disclosure advantageously enable to significantly reduce the employment of node resources (e.g. memory usage, processing, number of FIB table entries and number of updating operations on FIB tables), to limit the signalling and information spreading through the network and the bandwidth usage, to improve the overall scalability of the system and contributes to provide very fast LSPs reconfiguration at each handoff procedure execution, reducing the chance to incur into transmission errors.

Reconfiguration of the network can be thus performed very quickly (e.g. with latency in the order of few milliseconds) without service disruption and loss of data packets.

As clear from the above description, according to the present disclosure, packet communications between the Vi-LER and the Cj-LER (via the primary border node SB/SB' and the mobile border node MB/MB') as well as between the Cj-LER and the G-LER are established by means of two disjoint label-switched paths. IP addresses of client devices of the mobile domain Vi need not to be notified to nodes of the primary domain Cj or to the G-LER. Client devices of the mobile domain Vi can thus maintain the same IP address during mobility, preserving data packets connections intact.

In particular, from the label-switched network perspective, client devices of both the mobile domain Vi and the primary domain Cj maintain their reachability binding (that is they continue to be reachable) behind a same label-switched node during the entire lifetime of the system. The reconfiguration effects induced by mobility are completely masked to all client devices by the FIB table modifications on label-switched nodes. Indeed, said FIB table modifications effectively avoid any changes in Layer-2 and Layer-3 reachability information stored across the network about the client devices, as if the client devices were in fact mutually static.

According to the present disclosure, mobility management is performed by the G-LER, Cj-LER, Vi-LER and the Nj label switched nodes of the Cj primary domains, and the Mi label switched nodes of the Vi mobile domains. The rest of the communication network 1, including the backbone 400, the default gateway Core-GW of the core network 10 and the default gateway Cj-GW of the primary domains are not involved in handling mobility management and communicate using standard IP routing. Mobility management according to the present disclosure can thus be implemented in a pre-existing network by installing and suitably configuring the G-LER, Cj-LER, Vi-LER and the Nj label switched nodes of the Cj primary domains and the Mi label switched nodes of the Vi mobile domains, requiring no substantial changes to the rest of the communication network 1 and pre-existing devices (e.g. client devices, default gateways . . . ).

While there have been shown and described illustrative embodiments that provide for mobility management in a label switched network, it is to be understood that various other adaptations and modifications may be made within the spirit and scope of the embodiments herein. For example, while certain embodiments are described herein with respect to certain mobile domain deployment locations, such as trains, the techniques herein are not limited as such and can be applied to any number of mobile domains, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a gateway label edge router, a packet destined for a mobile domain that comprises a vehicle label edge router;
identifying, by the gateway label edge router and from among a plurality of primary domains, a particular primary domain that currently has a label switched connection with the mobile domain, wherein the label switched connection connects the vehicle label edge router of the mobile domain and a cluster label edge router of the particular primary domain;
sending, by the gateway label edge router, the packet to the cluster label edge router of the particular primary domain for transmission to the vehicle label edge router via the label switched connection;
tracking, by the gateway label edge router, when the vehicle label edge router of the mobile domain establishes a new label switched connection with a second cluster label edge router of a different primary domain in the plurality of primary domains than that of the particular primary domain; and
receiving, at the gateway label edge router and from the cluster label edge router of the particular primary domain, a second packet destined for the mobile domain, when the cluster label edge router of the particular primary domain does not have a label switched connection with the vehicle label edge router of the mobile domain.

2. The method as in claim 1, wherein tracking when the vehicle label edge router of the mobile domain establishes a new label switched connection with a second cluster label edge router of a different primary domain in the plurality of primary domains than that of the particular primary domain comprises:
receiving an indication from the second cluster label edge router of the vehicle label edge router establishing the new label switched connection with the second cluster label edge router.

3. The method as in claim 1, wherein the gateway label edge router identifies, from among a plurality of primary domains, the particular primary domain from a forwarding information base (FIB) table maintained by the gateway label edge router.

4. The method as in claim 1, further comprising:
identifying, by the gateway label edge router, the second cluster label edge router as currently having a label switched connection with the vehicle label edge router of the mobile domain; and
sending, by the gateway label edge router, the second packet to the second cluster label edge router for delivery to the mobile domain.

5. The method as in claim 1, further comprising:
encapsulating, by the gateway label edge router, the packet into a Layer 2-over-Layer 3 tunnel, prior to sending the packet to the cluster label edge router of the particular primary domain for transmission to the vehicle label edge router via the label switched connection.

6. The method as in claim 1, wherein the mobile domain is assigned to a first Internet Protocol (IP) subnet and forms a first broadcast domain, and wherein the particular primary domain is assigned to a second IP subnet and forms a second broadcast domain.

7. The method as in claim 1, wherein the particular primary domain comprises a plurality of nodes, and wherein the cluster label edge router of the particular primary domain causes other nodes of the particular primary domain to update their respective stores when the mobile domain establishes the new label switched connection with the second cluster label edge router.

8. The method as in claim 1, wherein the vehicle label edge router is located on a train.

9. An apparatus, comprising:
one or more network interfaces;
a processor coupled to the one or more network interfaces and configured to execute one or more processes; and
a memory configured to store a process that is executable by the processor, the process when executed configured to:
receive a packet destined for a mobile domain that comprises a vehicle label edge router;
identify, from among a plurality of primary domains, a particular primary domain that currently has a label switched connection with the mobile domain, wherein the label switched connection connects the vehicle label edge router of the mobile domain and a cluster label edge router of the particular primary domain;
send the packet to the cluster label edge router of the particular primary domain for transmission to the vehicle label edge router via the label switched connection;
track when the vehicle label edge router of the mobile domain establishes a new label switched connection with a second cluster label edge router of a different primary domain in the plurality of primary domains than that of the particular primary domain; and
receive, from the cluster label edge router of the particular primary domain, a second packet destined for the mobile domain, when the cluster label edge router of the particular primary domain does not have a label switched connection with the vehicle label edge router of the mobile domain.

10. The apparatus as in claim 9, wherein the apparatus is configured to track when the vehicle label edge router of the mobile domain establishes a new label switched connection with a second cluster label edge router of a different primary domain in the plurality of primary domains than that of the particular primary domain by:
receiving an indication from the second cluster label edge router of the vehicle label edge router establishing the new label switched connection with the second cluster label edge router.

11. The apparatus as in claim 9, wherein the apparatus identifies, from among a plurality of primary domains, the particular primary domain from a forwarding information base (FIB) table maintained by the apparatus.

12. The apparatus as in claim 9, wherein the process when executed is further configured to:
identify the second cluster label edge router as currently having a label switched connection with the vehicle label edge router of the mobile domain; and
send the second packet to the second cluster label edge router for delivery to the mobile domain.

13. The apparatus as in claim 9, wherein the process when executed is further configured to:
encapsulate the packet into a Layer 2-over-Layer 3 tunnel, prior to sending the packet to the cluster label edge router of the particular primary domain for transmission to the vehicle label edge router via the label switched connection.

14. The apparatus as in claim 9, wherein the mobile domain is assigned to a first Internet Protocol (IP) subnet and forms a first broadcast domain, and wherein the particular primary domain is assigned to a second IP subnet and forms a second broadcast domain.

15. The apparatus as in claim 9, wherein the particular primary domain comprises a plurality of nodes, and wherein the cluster label edge router of the particular primary domain causes other nodes of the particular primary domain to update their respective stores when the mobile domain establishes the new label switched connection with the second cluster label edge router.

16. The apparatus as in claim 11, wherein the vehicle label edge router is located on a train.

17. A tangible, non-transitory, computer-readable medium that stores program instructions causing a gateway label edge router to execute a process comprising:
   receiving, at the gateway label edge router, a packet destined for a mobile domain that comprises a vehicle label edge router;
   identifying, by the gateway label edge router and from among a plurality of primary domains, a particular primary domain that currently has a label switched connection with the mobile domain, wherein the label switched connection connects the vehicle label edge router of the mobile domain and a cluster label edge router of the particular primary domain;
   sending, by the gateway label edge router, the packet to the cluster label edge router of the particular primary domain for transmission to the vehicle label edge router via the label switched connection;
   tracking, by the gateway label edge router, when the vehicle label edge router of the mobile domain establishes a new label switched connection with a second cluster label edge router of a different primary domain in the plurality of primary domains than that of the particular primary domain; and
   receiving, at the gateway label edge router and from the cluster label edge router of the particular primary domain, a second packet destined for the mobile domain, when the cluster label edge router of the particular primary domain does not have a label switched connection with the vehicle label edge router of the mobile domain.

18. The tangible, non-transitory, computer-readable medium as in claim 17, wherein tracking when the vehicle label edge router of the mobile domain establishes a new label switched connection with a second cluster label edge router of a different primary domain in the plurality of primary domains than that of the particular primary domain comprises:
   receiving an indication from the second cluster label edge router of the vehicle label edge router establishing the new label switched connection with the second cluster label edge router.

19. The tangible, non-transitory, computer-readable medium as in claim 17, further comprising:
   identifying, by the gateway label edge router, the second cluster label edge router as currently having a label switched connection with the vehicle label edge router of the mobile domain; and
   sending, by the gateway label edge router, the second packet to the second cluster label edge router for delivery to the mobile domain.

20. The tangible, non-transitory, computer-readable medium as in claim 17, further comprising:
   encapsulating, by the gateway label edge router, the packet into a Layer 2-over-Layer 3 tunnel, prior to sending the packet to the cluster label edge router of the particular primary domain for transmission to the vehicle label edge router via the label switched connection.

* * * * *

UNITED STATES PATENT AND TRADEMARK OFFICE
CERTIFICATE OF CORRECTION

| | | |
|---|---|---|
| PATENT NO. | : 11,792,121 B2 | Page 1 of 1 |
| APPLICATION NO. | : 17/976405 | |
| DATED | : October 10, 2023 | |
| INVENTOR(S) | : Luca Bisti et al. | |

It is certified that error appears in the above-identified patent and that said Letters Patent is hereby corrected as shown below:

In the Specification

Column 17, Line 15 please amend as shown:
of V1.

Column 17, Line 31 please amend as shown:
nodes S11, S12, S13, S14, S21, S22, S31, S32 in a continuous Column 17, Line 35 please amend as shown:
each node S11, S12, S13, S14, S21, S22, S31, S32 of the primary Column 20, Line 49 please amend as shown:
the N1 label-switched nodes to the M1 mobile label-switched Column 21, Line 58 please amend as shown:
domains V1, V2.

Column 22, Line 29 please amend as shown:
intra-mobile-domain LSP within the mobile domain V1. The Column 24, Line 26 please amend as shown:
will access the NHLFE table with the index IO, will POP Signed and Sealed this
Fifth Day of December, 2023

Katherine Kelly Vidal
*Director of the United States Patent and Trademark Office*